United States Patent
Emma et al.

(10) Patent No.: US 7,493,480 B2
(45) Date of Patent: Feb. 17, 2009

(54) METHOD AND APPARATUS FOR PREFETCHING BRANCH HISTORY INFORMATION

(75) Inventors: Philip G. Emma, Danbury, CT (US); Klaus J. Getzlaff, Schonaich (DE); Allan M. Hartstein, Chappaqua, NY (US); Thomas Pflueger, Leinfelden (DE); Thomas R. Puzak, Ridgefield, CT (US); Eric Mark Schwarz, Gardiner, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/197,714

(22) Filed: Jul. 18, 2002

(65) Prior Publication Data

US 2004/0015683 A1   Jan. 22, 2004

(51) Int. Cl.
*G06F 9/00* (2006.01)
(52) U.S. Cl. ...................................................... 712/240
(58) Field of Classification Search ................. 712/240, 712/239, 237
See application file for complete search history.

(56) References Cited

U.S. PATENT DOCUMENTS

| | | | | |
|---|---|---|---|---|
| 4,679,141 A | | 7/1987 | Pomerene et al. ............ 364/200 |
| 4,719,568 A | * | 1/1988 | Carrubba et al. ............. 711/123 |
| 5,889,985 A | * | 3/1999 | Babaian et al. .............. 712/225 |
| 5,896,523 A | * | 4/1999 | Bissett et al. ................ 713/400 |
| 6,119,203 A | * | 9/2000 | Snyder et al. ................ 711/137 |
| 6,119,222 A | * | 9/2000 | Shiell et al. .................. 712/238 |
| 6,212,603 B1 | * | 4/2001 | McInerney et al. ........... 711/125 |
| 7,337,271 B2 | * | 2/2008 | Emma et al. ................. 711/117 |

OTHER PUBLICATIONS

Pinter, Shlomit S. and Yoaz, Adi. "Tango: a Hardware-based Data Prefetching Technique for Superscalar ." IEEE, 1996. pp. 214-225.*
WordNet 2.0, 2003 Princeton University.*
The American Heritage Dictionary of the English Language, Fourth Edition. Houghton Mifflin Company, 2000. Found on www.dictionary.com, Aug. 23, 2005.*
Handy, Jim, The Cache Memory Book, Academic Press, 1998, pp. 89-90.*
IBM TDB NN87034524. "Mechanism for Recording Prefetching History in BHT" vol. 29, issue 10, published Mar. 1, 1987. pp. 4524-4526.*

* cited by examiner

*Primary Examiner*—Eddie P Chan
*Assistant Examiner*—Jacob Petranek
(74) *Attorney, Agent, or Firm*—F. Chau & Associates, LLC

(57) ABSTRACT

A two level branch history table (TLBHT) is substantially improved by providing a mechanism to prefetch entries from the very large second level branch history table (L2 BHT) into the active (very fast) first level branch history table (L1 BHT) before the processor uses them in the branch prediction process and at the same time prefetch cache misses into the instruction cache. The mechanism prefetches entries from the very large L2 BHT into the very fast L1 BHT before the processor uses them in the branch prediction process. A TLBHT is successful because it can prefetch branch entries into the L1 BHT sufficiently ahead of the time the entry is needed. This feature of the TLBHT is also used to prefetch instructions into the cache ahead of their use. In fact, the timeliness of the prefetches produced by the TLBHT can be used to remove most of the cycle time penalty incurred by cache misses.

17 Claims, 14 Drawing Sheets

Branch History Table

| Branch Instruction Address | Target Address of Branch |
|---|---|
|  |  |
|  |  |
|  |  |
|  |  |
|  |  |
|  |  |
|  |  |

FIG. 3

Branch 1 target address points to same cache line
Branch 2 target address points to next sequential line
Branch 3 target address points to new cache line
Branch 4 target address points to new cache line

Prefetch Action Table

Prefetch Bit

|  | 0 | 1 |
|---|---|---|
| Confirmation Bit 0 | No Prefetch Will Occur | Fetch-No-Data Prefetch |
| Confirmation Bit 1 | No Prefetch Will Occur | Data Prefetch |

FIG. 11

METHOD AND APPARATUS FOR PREFETCHING BRANCH HISTORY INFORMATION

FIELD OF THE INVENTION

The present invention relates to the field of data processing, and specifically is directed to the processing of branch instructions and the operation of prefetching information into the cache in a data processing system.

BACKGROUND OF THE INVENTION

In most high performance processors, pipelining is used as a means to improve performance. Pipelining allows a processor to be divided into separate components where each component is responsible for completing a different phase of an instruction's execution. For example, FIG. 1 shows the major components that make up a processor's pipeline. The components are instruction fetch (stage I), instruction decode (stage II), address generation (stage III), operand fetch (stage IV), instruction execution (stage V), and put away of results (stage VI). Each instruction enters the pipeline and ideally spends one cycle at each pipeline stage. Individually, each instruction takes six cycles to pass through the pipeline. However, if the pipeline can be kept full, then each component of the processor (pipeline stage) can be kept active working on a different instruction, each at a different pipeline stage, and one instruction can be completed in every cycle. Unfortunately keeping the pipeline full is not easy. Pipeline stalls frequently occur and processing elements become idle and performance is lost.

A major reason for pipeline stalls is the frequent occurrence of branch instructions. The branch instruction introduces a temporary uncertainty into the pipeline because, in order to keep the pipeline full, the processor must guess which one of two possible instructions enters the pipeline next; the fall through instruction or the target of the branch. Most high performance processors will guess the outcome of the branch before it executes and then proceed to fetch and decode instructions down the path that is guessed (either taken or not taken). A number of patents are directed to branch prediction mechanisms, each having certain advantages and disadvantages. For example, U.S. Pat. No. 4,679,141 to Pomerene discloses a branch predictor that is divided into two parts: a fast active area that is relatively small in size but can be searched in one cycle and a large backup area that requires many cycles to search. Branches are transferred from the large backup area to the small active area as they are needed, much in the same manner as cache misses are brought from a second level storage cache (L2) to the first level L1 cache. However, no attempt is made to prefetch blocks of BHT entries from the second backup area to the active area ahead of their use. According to the present invention, a prefetching mechanism is described that anticipates which branch entries in the second level branch prediction table will be used in the near future and transfers these entries to the fast (small), active level branch prediction table ahead of their use. Additionally, in the present invention, branch prediction entries that are prefetched to the active BHT identify blocks of instructions (cache lines) that should be prefetched into the (instruction) cache. No mechanism exists in U.S. Pat. No. 4,679,141 to prefetch lines of memory into the cache U.S. Pat. Nos. 5,163,140, 5,327,547, 5,515,518, and 6,067,616 to Stiles et al. describe a two level branch prediction mechanism that is divided to two parts to save hardware or chip area. The first level is a small structure that saves full prediction information for a limited number of branch instructions. The second level is a larger structure that saves only partial prediction information. Thus the second level of the branch prediction mechanism contains information on a larger number of branches than the first level but the information is not as complete as the first level. As each instruction is fetched and decoded its address is simultaneously sent to both levels of the branch prediction mechanism. Branches found in the second level table are assumed to be within the address space of the first level and will be supplied address information from the first level branch prediction table.

In these patents each level of the branch prediction mechanism is an active level and is searched on each cycle to predict a branch. No mechanism exists to prefetch branch prediction entries between levels of the branch prediction mechanism and no mechanism exists to prefetch lines of memory into the (instruction) cache.

U.S. Pat. No. 5,875,325 to Talcott describes a mechanism that saves a group of speculative branch instructions and at least one group of bits that indicates a previous resolution of branch instructions. A compressed branch history is generated that indicates a larger number of previous like actions for a group. This reduces the size of the history mechanism needed to record this information over previous mechanisms. In this patent the branch prediction mechanism is an active area and no mechanism exists to prefetch instructions into the cache.

U.S. Pat. No. 5,584,001 to Hoyt et al describes a prediction mechanism that maintains both speculative history and actual history for each branch instruction. The speculative history contains the actual history plus the 'history' of recent branch predictions for the branch. As the speculative history becomes the actual history the speculative predictions can be checked. If a miss prediction is made, the speculative predictions are discarded and the prediction process begins anew. Again, in this patent the branch prediction mechanism is an active level and is searched on every cycle to predict each branch.

Branch prediction mechanisms are also able to assist in cache prefetching. IBM Technical Disclosure Bulletin, "Next-sequential Prefetching Using a Branch History Table", Vol. 29, No. 10 March 1987, to Emma et al describes a BHT that has an indicator (bit) for prefetching the next-sequential cache line into the cache. The BHT only consists of an active area and only next-sequential lines are prefetched.

IBM Technical Disclosure Bulletin, "Prefetching Using a Pagable Branch History Table", Vol. 28, No 8, January 1986, to Pomerene et al describes a means where the Pagable Branch History Table is augmented by a segment table and second level cache directory. The segment table is sorted in order of branch addresses and exit addresses from a cache line. Prefetches are made by examining the segment table. This mechanism requires a secondary segment table and secondary level cache directory to accomplish prefetching by identifying branches from the existing branch history table entries.

IBM Technical Disclosure Bulletin, "Using a Branch History Table to Prefetch Cache Lines", Vol. 22, No. 12 May 1980, to R. N. Rechtschaffen, allows the branch history table to issue prefetches to the cache. This mechanism uses a active branch history table and requires the branch history table to have a large number of entries in order to generate address that are not in the cache.

The prior art described above typically uses a branch history table or branch target buffer to remember the action (either taken or not-taken) and target address of previously encountered branches. The accuracy of the branch prediction mechanism largely depends on the size of the branch history table.

Practical sizes of the branch history table are 16K to 32K branch entries. If each entry consists of two four-byte address fields (representing the branch address and target address) then a branch history table is 128 k to 256 k bytes of information. Branch prediction accuracy could be improved if the BHT could be made larger. However, the table hardware must be packaged in the speed critical instruction fetch and branch prediction area of the machine. It would be important to reduce rather than increase the table hardware in this area, because the more hardware that must be put in this area the longer wiring distances become and the greater the number of logic delays which are encountered in the critical paths determining the cycle time. These would, of course, lengthen the cycle time and a longer cycle time works against improving a machine's speed. We, therefore, seek improvements which will not place more hardware in the critical area.

SUMMARY OF THE INVENTION

A technique is disclosed for prefetching branch history information from a higher-level memory area to a lower-level memory area. Branch history information is prefetched before use by a processor in the branch prediction process. This feature is also used to prefetch instructions into the cache ahead of their use. The timeliness of the prefetches can be used to remove most of the cycle time penalty incurred by cache misses.

According to an aspect of the invention, there is provided a method for prefetching branch history information from a higher-level memory area to a lower-level memory area for a processor having a multistage execution pipeline. This method includes receiving a request to prefetch branch history information for a specified block of memory. Additional branch history information to prefetch is then identified. The branch history information for the specified block of memory is sent from the higher-level memory area to the lower-level memory area.

According to another aspect of the invention, nearest neighbor branch history information is identified for the specified block of memory. According to another aspect of the invention, this nearest neighbor branch history information includes branch history information for branches associated with the next sequential block of memory and branches associated with blocks of memory branched to from the specified block of memory. According to another aspect of the invention, the branch history information includes branch address fields, target address fields, and branch direction information. According to another aspect of the invention, nearest neighbor branch history information is identified by matching a target address of the branch history information to a new block address (i.e., line address) of nearest neighbor lines that contain branch information saved in the higher-level memory area.

According to another aspect of the invention, the method for prefetching branch history information further includes the step of recursively identifying nearest neighbor branch history information for the blocks of memory associated with nearest neighbor branches already identified. The recursive operation ends when a particular termination condition is met. According to an aspect of the invention, the termination condition occurs after reaching a predefined distance from the initial prefetch or a new request to prefetch branch history information is received.

According to another aspect of the invention, identifying nearest neighbor branch history information is performed concurrently with the normal branch prediction mechanism of the processor.

According to another aspect of the invention, identified branch history information is sent from the higher-level memory area to the lower-level memory area. According to another aspect of the invention, the branch history information prefetched from the higher-level memory area to the lower-level memory area includes branch history information prefetched from higher levels of cache memory to lower levels of cache memory. According to another aspect of the invention, the branch history information is stored in multi-levels of memory.

According to another aspect of the invention, the prefetch request includes address information specifying the block of memory and branch history information containing a branch address, target address and branch directory information.

According to another aspect of the invention, there is further provided a method for prefetching blocks of instructions from higher levels of a memory hierarchy to lower levels of the memory hierarchy using address information that is stored in branch history information. This method includes receiving a request to prefetch branch history information. Lines of memory to be prefetched are then identified and prefetched from a higher-level memory area to a lower-level memory area.

According to another aspect of this method for prefetching blocks of instructions, prefetched lines of memory include nearest neighbor line addresses that contain branch history information. According to another aspect of the invention, the nearest neighbor line addresses include line addresses for branches associated with the next sequential block of memory and branches associated with blocks of memory branched to from the specified block of memory. According to another aspect of the invention, nearest neighbor branch history information is identified by matching a target address of the branch history information to a new block address (i.e., line address) of nearest neighbor lines that contain branch information saved in the higher-level memory area.

According to another aspect of the invention, the method for prefetching blocks of instructions further includes the step of recursively identifying nearest neighbor branch history information for the blocks of memory associated with nearest neighbor branches already identified. The recursive operation ends when a particular termination condition is met. According to an aspect of the invention, the termination condition occurs after reaching a predefined distance from the initial prefetch or a new request to prefetch branch history information is received. According to another aspect of the invention, the prefetch request includes address information specifying the block of memory and branch history information containing a branch address, target address and branch directory information.

According to another aspect of the invention, the method for prefetching blocks of instructions further includes the step of confirming the usefulness of prefetching a block of memory from the higher level memory area to the lower level memory area from information saved in the branch history information. According to another aspect of the invention, each entry of the branch history information includes a field that identifies the usefulness of prefetching blocks of instructions from higher levels of the memory area to lower levels of the memory area. According to another aspect of the invention, a block of memory is prefetched only if a confirmation value indicates that the branch history information is producing useful prefetches.

These and other aspects, features and advantages of the present invention will become apparent from the following detailed description of preferred embodiments, which is to be read in connection with the accompanying drawings.

BRIEF DESCRIPTION OF THE DRAWINGS

FIG. 3 illustrates the structure of a conventional Branch History Table (BHT);

FIG. 11 summarizes the instruction cache prefetching actions based on the prefetch bit and confirmation bit values;

DETAILED DESCRIPTION OF PREFERRED EMBODIMENTS

According to the present invention, a two level branch history table(TLBHT)is described, which does not add hardware to the critical path and, in fact, reduces the amount of hardware in the critical path. An analogy can be drawn to the relation between a cache and memory. Increasing the cache size is usually desirable but not always possible or practical because of limitations in chip area and cycle time restrictions. Instead of increasing the cache size a second level cache (L2) is added to the memory hierarchy to improve performance. Now, just as prefetching is used to stage lines of memory between the L2 and the L1 cache, prefetching between the second level BHT and the first level BHT is a desirable means to improve performance without increasing the size of the BHT in the speed critical area of the machine. By prefetching BHT entries from the second level BHT to the first level BHT the active area of the branch prediction mechanism can be kept small and the impact on the processor's cycle time is minimized. In addition, the BHT entries prefetched between the two levels of the BHT also provide a means to prefetch lines of memory into the cache. This minimizes the amount of hardware needed to assist cache prefetching.

A key component in any modern high performance processor organization is a fast and accurate branch prediction mechanism. However, it is becoming increasingly difficult for the branch prediction mechanism to complete a search in one or two cycles because of two factors: decreasing cycle time and increasing size of the branch history tables (BHT).

One mechanism that avoids many of these problems is a two-level branch history table (TLBHT). Here the BHT is divided into two parts: a small active area (L1 BHT) and a large backup area (L2 BHT). The L1 BHT is optimally located in the processor's layout allowing a one cycle access. The L2 BHT is located outside the critical part of the processor's layout and is therefore made much larger than would be practical for a conventional BHT which has only a single active area.

This invention describes a method that uses a two level BHT to prefetch entries from the very large L2 BHT into the active (very fast) L1 BHT before the processor uses them in the branch prediction process and at the same time prefetch cache misses into the instruction cache.

The mechanism prefetches entries from the very large L2 BHT into the very fast L1 BHT before the processor uses them in the branch prediction process. A TLBHT is successful because it can prefetch branch entries into the L1 BHT sufficiently ahead of the time the entries are needed. This feature of the TLBHT can also be used to prefetch instructions into the cache ahead of their use. In fact, the timeliness of the prefetches produced by the TLBHT can be used to remove most of the miss latency penalty incurred by cache misses.

Figure 1:
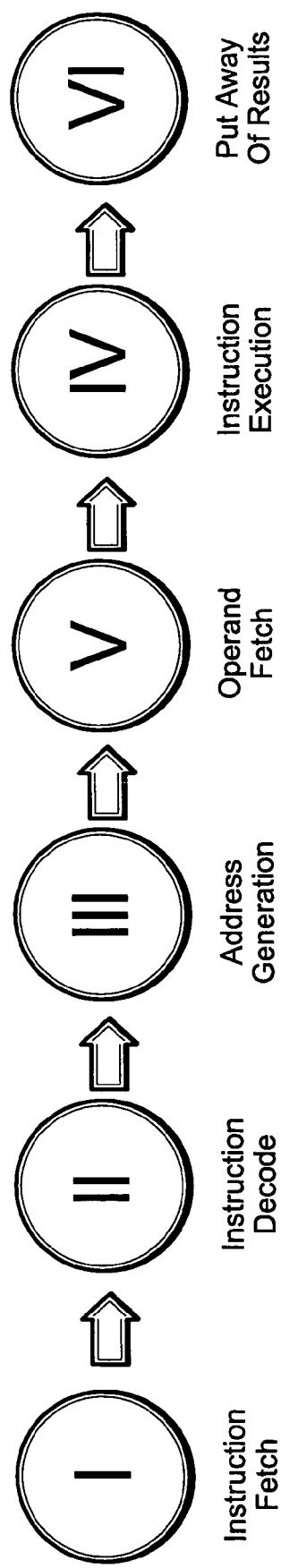
FIG. 1 is a pictorial representation of the stages of a pipelined processor.
Figure 2:
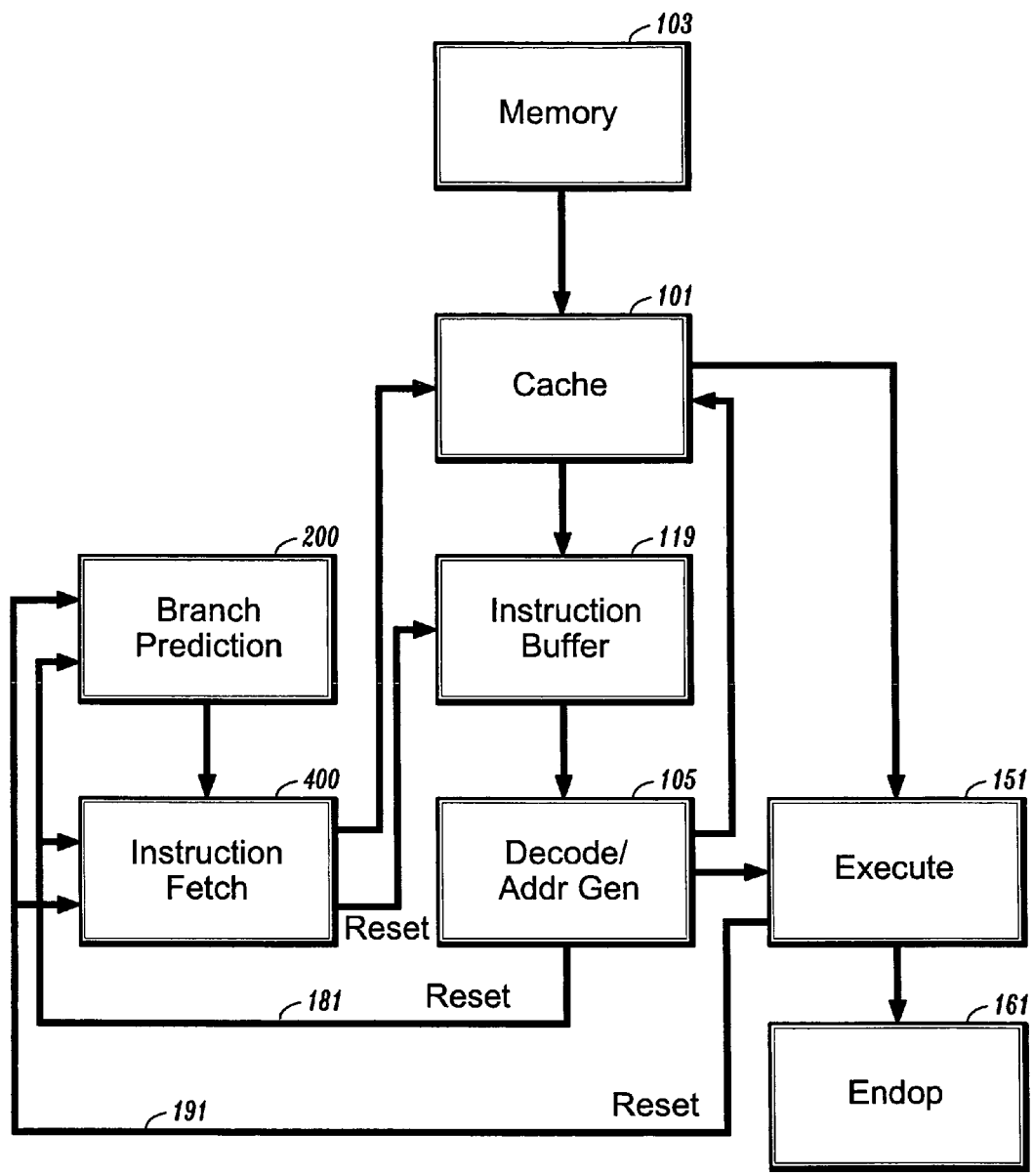
FIG. 2 is a functional block diagram of a conventional processor.

FIG. 2 illustrates the essential components of a typical high performance processor. For description purposes only, FIG. 2 emphasizes the instruction fetching and branch prediction portions of a processor and de-emphasizes or omits many other features necessary for a complete design.

The main memory 103 contains instructions and operands of programs executing on the processor. Instructions and operands are fetched from main memory 103 and stored in the cache 101. Each fetch specifies a 'line' of memory, where a line represents a fixed size block of information transferred between the cache and memory Line sizes typically range from 128 to 256 bytes. As shown, the cache 101 is a unified cache holding both instructions and operands. Typically there are two caches, one for instructions and one for data (operands). This is commonly called a split cache. A more detailed description of the structure and cache 101 may be found in A. J. Smith "Cache Memories", Computing Surveys, vol. 14 no. 3, September 1982, pp. 473-530, herein incorporated by reference in its entirety.

Instructions are staged from the cache 101 into an instruction buffer (IB) 119. The IB 119 typically holds the next N instructions in sequence following the one currently being decoded. Typical values for N are 8 or 16. Instructions can be fetched from the cache individually. However it is usually desirable to fetch instructions from the cache in blocks where a block is typically 8 to 16 bytes wide and the address of each block fetched is adjusted to an 8 or 16 bytes boundary depending on the width of the block fetched.

Instructions are transferred from the instruction buffer to the decode/agen (decode/address generation) mechanism 105. The decode/agen unit 105 then performs any needed operand address calculations and verifies (when possible) that the branch prediction mechanism 200 and instruction fetch mechanism 400 have correctly predicted the actions of any encountered branches. Operand address information of the instruction (if any) is calculated and sent as a fetch request to the cache 101. If the instruction just decoded is a branch, the decode information and address generation information (target of the branch) is sent to the branch prediction mechanism 200 and instruction fetch mechanism 400. These units can then detect if a error has occurred. This process will be described more fully below.

After an instruction is decoded, execution information is sent to the execution unit 151 where it will be held until any needed data (requested during the address generation phase) is returned from the cache 101. When the needed data is available, execution of the instruction is completed and the results putaway as required by the particular instruction. Finally, an Endop function or signal 161 is issued to mark the point in time when the instruction is successfully completed.

The branch prediction mechanism 200 uses a Branch History Table (BHT) to predict the outcome of a branch; either taken or not taken. The branch prediction mechanism is initially given a starting address in a instruction stream and searches the BHT to identify the next taken branch that will be encountered by the processor. A more detailed description of the structure and operations may be found in U.S. Pat. No. 4,679,141 incorporated herein by reference in its entirety. The predicted taken branch found by the branch prediction mechanism is used to guide the instruction fetching mechanism 400.

Although it is quite accurate, the branch prediction mechanism can incur prediction errors from time to time. Branch prediction errors can be detected at three points in the pipeline. First a branch prediction error can be detected after the decode phase of an instruction. If an unconditional branch is decoded and the branch prediction mechanism failed to predict a branch at the instruction's address then a prediction error has occurred. When this occurs the instruction fetch mechanism and branch prediction mechanism are signaled that a branch prediction error has occurred via path 181. The branch prediction mechanism will then begin a new branch prediction sequence of instructions using the target address of the branch just decoded as the new starting address. Similarly, the instruction fetching mechanism will begin fetching instructions from the target address of the branch just decoded.

Second, whenever a branch is decoded an error in the predicted target address can be detected early, after the branch target address has been generated. Here, the predicted target address of the branch prediction mechanism is compared against the target address of the branch at the end of the address generation phase. If the addresses do not match, a branch prediction error has occurred and the branch prediction mechanism and the instructions fetching mechanism are signaled via path 181 and a new sequence of predictions and instruction fetches can begin.

Third, a taken or not-taken prediction error can be detected at the end of instruction execution. For example, if the branch prediction mechanism predicts that a branch will be taken and at the end of execution the branch is not taken then an error has occurred. Similarly, a prediction error occurs when the branch prediction mechanism predicts a branch is not-taken and it is taken at the end of execution. If the action of the branch does not match the predicted action of the branch prediction mechanism then the instruction fetch mechanism and branch prediction mechanism must be restarted. These units are signaled via path 191 that a prediction error has occurred and begin a new prediction sequence and instruction fetch sequence at the correct instruction following the branch.

The operations of the instruction fetching mechanism and branch prediction mechanism utilizing a conventional branch history table are explained as a prelude to the operations of the prefetch mechanism implemented in the two level branch history table.

FIG. 3 shows the structure of a Branch history Table 201. For simplicity of this description we assume each entry in a branch history table contains two fields:
1. The address of a branch instruction 202
2. The predicted target address 204 associated with the branch identified in field 1.

By definition, any entry in a BHT represents a branch address and target address of a branch that was previously taken. The BHT only contains information on branches that were taken at least once.

For the remainder of this discussion these two fields will be referred to as a BHT entry and contains a branch address (BA) and predicted target address (TA), respectively, and are represented as the ordered pair <BA,TA>.

In practice it is desirable to find (predict) taken branches early enough so that the instruction fetching mechanism can fetch instructions before they are needed, so that no delay will occur in the pipeline. This condition is usually not met if the target of the branch is fetched only after the branch is located and identified. Therefore, the branch prediction mechanism is usually organized and addressed on the basis of a 'branch prediction block'. In order for the branch prediction mechanism to be further ahead (in time) than the instruction fetching mechanism it is desirable for the branch prediction block to be larger than the instructions fetching block. For example, the branch prediction mechanism might be organized to search for branches within a 32 byte block, while the instruction fetching mechanism might issue fetches on a 16 byte basis. Thus, assuming only one search or fetch can occur per cycle, the branch prediction mechanism can be twice as far ahead (in time and distance) as the instruction fetching mechanism.

As mentioned above, the purpose of the BHT is to predict the next taken branch that will be encountered by the processor in advance of when the instructions are fetched from the cache. Note, when working properly, the BHT is predicting the outcome of a branch even before the instructions are fetched from the cache, and therefore before the decoder has determined that there is, in fact, a branch at that location.

Figure 4:
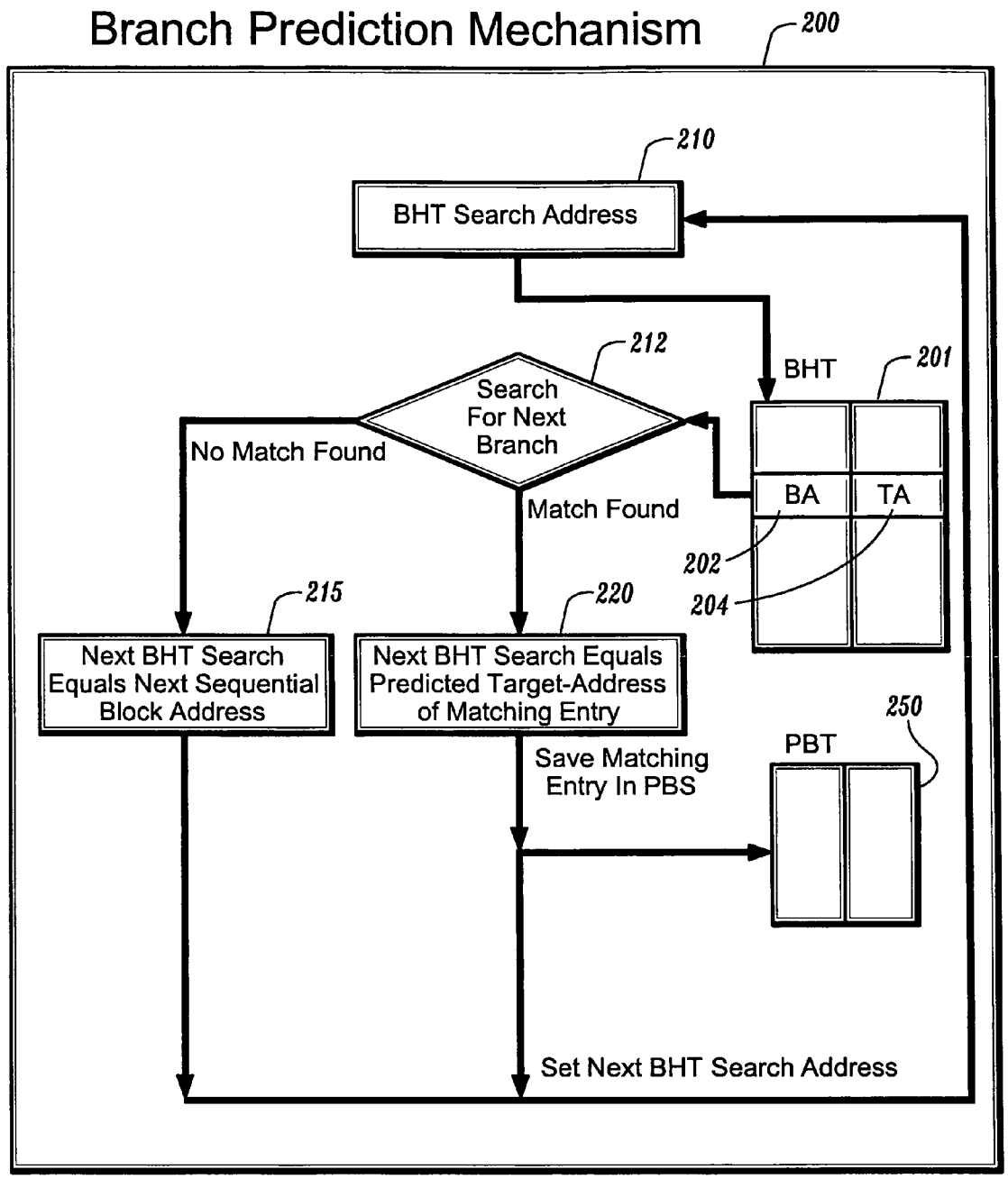
FIG. 4 is a functional block diagram of branch prediction mechanism used by a processor.

This process is shown in the following three Figures. FIG. 4 shows the actions of the branch prediction mechanism. Essentially the branch prediction mechanism predicts the immediate sequence (path) of instructions the processor will encounter (execute). The branch prediction mechanism searches the BHT to discover a sequence of taken branches that the processor will soon encounter and guides the instruction fetching mechanism through the correct sequence of instruction fetches that will be needed by the processor in the near future. Note, the sequence of predicted taken branches will be used to load the instruction buffer 119 with a sequence of instructions, whether next sequential or jumps to the targets of predicted branches.

The BHT is searched using the BHT Search Address 210. Typically, an initial BHT search address is supplied to the branch prediction mechanism from the execution unit or decode/agen unit after a branch wrong guess signal is detected. Then, the BHT 201 is searched using this address. The BHT search address 210 is compared against the branch address (BA) 202 fields contained in the BHT. A match/no-match signal is examined using compare logic 212. If a BHT search address misses all BHT entries, then the next BHT search address is updated to equal the 'next-sequential' block via path 215. For example, if the last BHT search address was 1000 and the BHT search block width is 32 bytes, then the next BHT search address is 1032.

If the BHT search address 210 'hits in the BHT' then branch prediction mechanism must be redirected to reflect the jump in the instruction stream predicted by the BHT entry.

The matching BHT entry (predicted branch address 202 and target address 204 of the next predicted taken branch) is sent to the Predicted Branch Table 250 (PBT) via path 220. The matching BHT entry is then saved in the PBT 250 and the next BHT search address is set equal to the predicted target address of the matching BHT entry.

Figure 5:
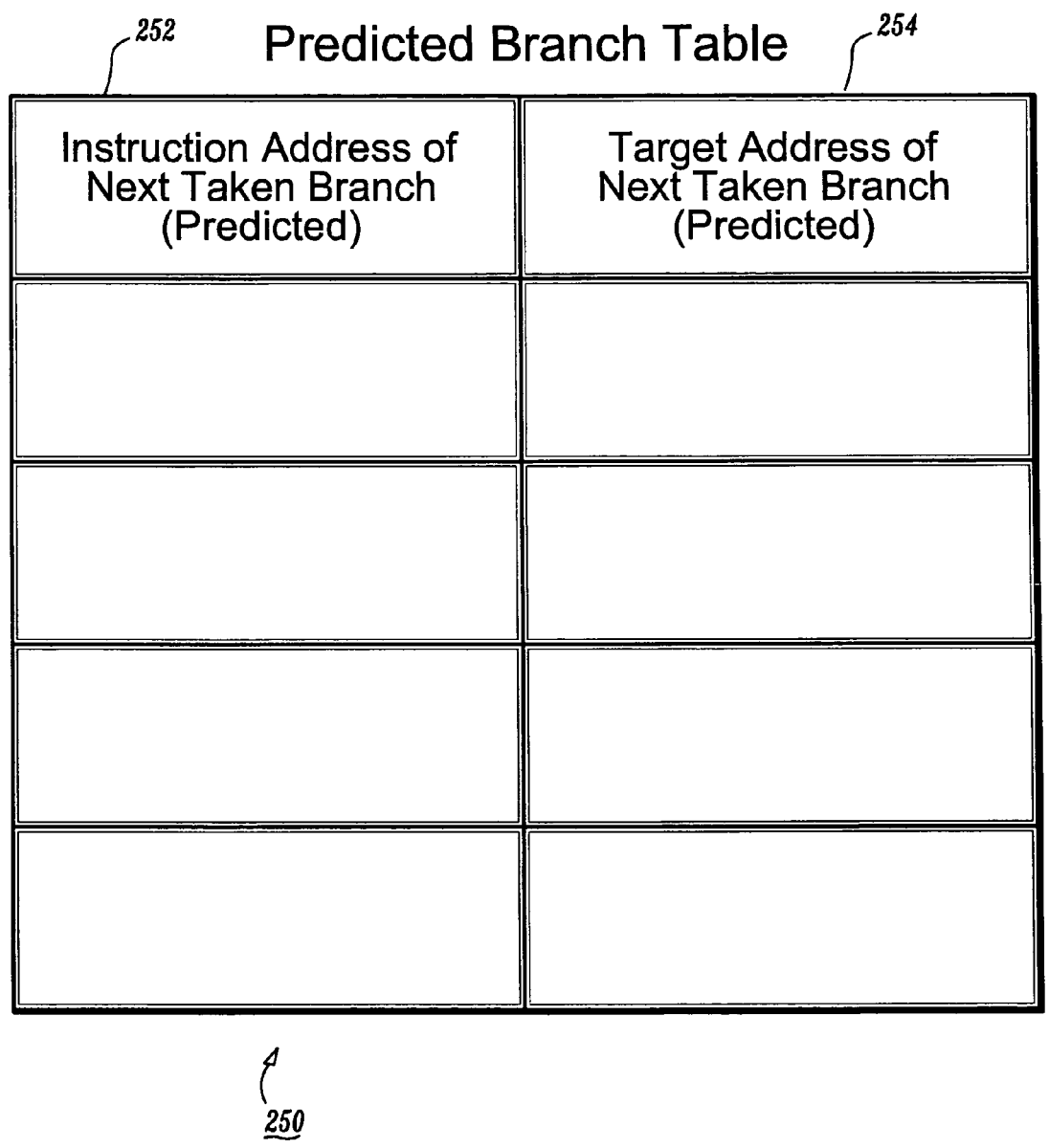
FIG. 5 illustrates the structure of a conventional Predicted Branch Table (PBT)

FIG. 5 shows the format of the Predicted Branch Table 250. Basically, each entry in the PBT is a BHT entry. The entries in the PBT identify a sequence of predicted taken branches that the processor will soon encounter. Each entry in the PBT contains two fields:

1. The address of the next predicted branch that will be taken 252
2. The target address 254 of the predicted branch associated with the branch identified in Field 1.

The branch prediction mechanism will place the branch address and predicted target address <BA,TA> of each predicted taken branch in the PBT in First In First Out (FIFO) order.

Whenever a branch is decoded the decode/agen 105 unit uses the entries in the PBT to determine if it was predicted to be a taken-branch (both branch address or target address) and the Execution unit 151 will use the PBT entries to determine if the action of a branch (taken or not taken) was correctly predicted.

As each branch is executed, if it was identified as a predicted taken branches (thus in the PBT), it is removed from the PBT. Note, as long as the BHT is correctly predicting the action of each future branch, the PBT will contain, (in FIFO sequence) the exact ordering of the taken branches encountered by the processor. If a taken branch is executed and not in the PBT, a branch prediction error has occurred.

Whenever a branch prediction error is detected, the entries in the PBT are discarded.

Recall, when a branch prediction error is detected the instruction fetching mechanism 400 and branch prediction mechanism 200 are reset to begin at the appropriate address following the branch prediction error.

Figure 6:
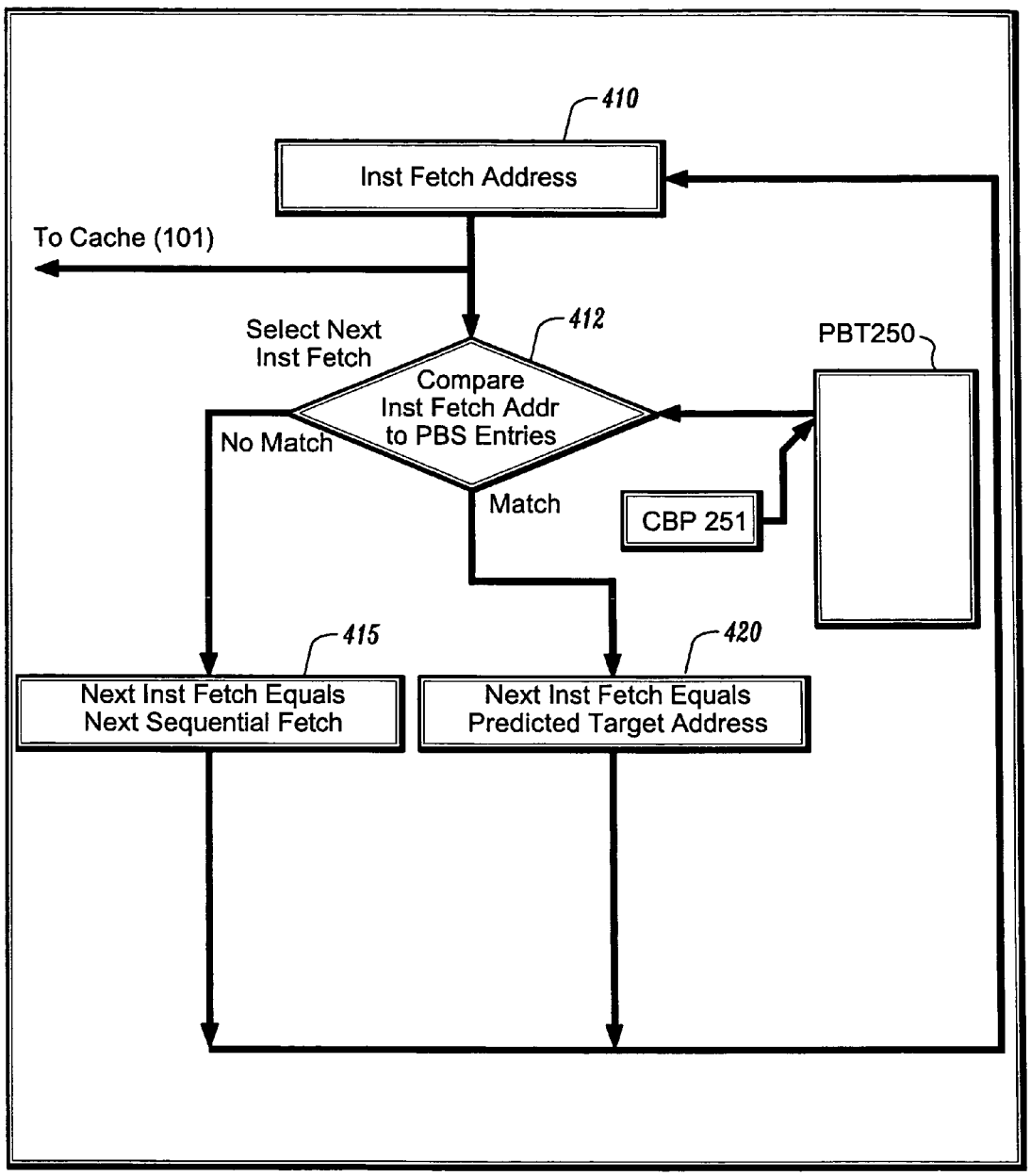
FIG. 6 is a functional block diagram of the instruction fetching mechanism used by a processor.

FIG. 6 shows the actions of the instruction fetch mechanism 400. Note the instruction fetching mechanism will issue instruction fetches to the cache and then determine the appropriate next-instruction-fetch address (either a next sequential fetch or the target address of a predicted branch). The instruction fetch address 410 is initially sent to the cache and then used to determine the 'next instruction address'. The instruction fetch address 410 is compared against the branch address (252) field of the next predicted taken branch contained in the PBT 250. Note, the entries in the PBT represent a sequence of predicted taken branches. Each predicted branch then corresponds to a jump in the instruction stream that the instruction fetching mechanism must follow. Address compare logic 412 compares the instruction fetch addresses to the sequence of predicted taken branches to determine if a jump in the instruction fetching stream is necessary. If a match is found, signaled via path 420, then a jump in the instruction stream is anticipated. When this occurs the next instruction fetch block is set equal to the target address of the matching PBT entry. If no match is found, path 415, the next 'instruction fetch block' is set equal to the 'next-sequential' fetch. For example, if the last instruction fetch was for address 2000 and the instruction fetch width is 16 bytes, then the next instruction fetch is 2016. The sequence of instructions loaded into the instruction buffer is a series of next sequential instructions up to a branch. If the branch is predicted as being taken, the instruction buffer is then seamlessly followed (loaded) by the instructions located at the target of the branch or the next sequential instruction following the branch if the branch is predicted as not taken.

To aid the instruction fetching mechanism in fetching the proper sequence of instructions, the PBT is indexed by a current-branch-pointer 251 CBP (FIG. 6). The CBP is used to select the next entry in the PBT that is used to match the current instruction fetch address. The CBP is initially set to one, indicating the first entry in the PBT is used to match the current instruction fetch block address. When a match occurs the CBP is incremented by one to allow the next entry in the PBT to be compared against future instruction fetch block addresses and the next instruction fetch block is set equal to the target address of the matching PBT entry. By incrementing the CBP each time an instruction fetch block matches a PBT entry, the instruction fetching mechanism can sequentially follow the path of instructions predicted by the branch prediction mechanism.

The following example will now explain the operation of the branch prediction mechanism and instruction fetching mechanism. Consider a program sequence that starts at address 1000 (in hex) and has three BHT entries representing three previously taken branches. Let the three BHT entries be denoted as the following <BA,TA> pairs:

<1020,1028>,
<1032,1050>,
and <1064,1090>.

That is, the first branch is located at location 1020 and branches to location 1028. The second branch is at location 1032 and branches to 1050. And, the third branch is at location 1064 and branches to 1090.

The branch prediction mechanism begins at location 1000 and tries to determine the next taken branch the program will encounter. Assuming the BHT search width is 32 bytes (20 hex), then the initial BHT search address (at location 1000) will not detect any predicted taken branch. The branch prediction mechanism will then set the next BHT search address to be 1020 (hex). This is illustrated in FIG. 4 via path 215. The next BHT search (at address 1020 hex) will detect the first BHT entry <1020,1028>. This entry will be saved in the PBT. The next BHT search address will be the target of the predict branch, this is address 1028. This is illustrated via path 220 of FIG. 4. Continuing this process the next four BHT search address are 1028, 1050, 1060 and 1090. At the end of this process three BHT entries will be saved in the PBT. They are <1020,1028>, <1032,1050>, and <1064, 1090>.

In parallel, the instruction fetching mechanism is issuing instruction fetches to the cache. Assume the instruction fetch width is 16 bytes, then the first instruction fetch is at location 1000 (hex). Since there is not a predicted branch contained in I-fetch-block 1000, the next instruction fetch is 1010 (hex). Recall, this is illustrated via path 415 of FIG. 6; each instruction fetch address is compared (in sequence starting from the top) against the predicted branch BHT entries saved in the PBT. Since the branch prediction search width is twice that of the instruction fetch width (32 bytes versus 16 bytes), the branch prediction mechanism can detect the branch at location 1020 on the second cycle while the instruction fetching mechanism is only fetching the I-fetch-block at location 1010. Continuing, instruction fetch address 1010 will not detect any predicted branch and the next instruction fetch address will be 1020. On the third cycle the instruction fetch address (1020 hex) will detect a match from the first BHT entry held in the PBT. This will cause the next instruction fetch address to be 1028. This is illustrated via path 420 of FIG. 6. Instruction fetch address 1028 will not detect a predicted branch (BHT entry) in the PBT and the next instruction fetch address will be 1030. Instruction fetch address 1030 will detect a BHT entry in the second position of the PBT and set the next instruction fetch address to 1050. Continuing this process the next 3 I-fetch-blocks are 1050, 1060, 1090.

Throughout this process, the PBT is indexed by a current-branch-pointer 251 CBP (FIG. 6). Recall, the CBP is used to select the next entry in the PBT that is used to match the current instruction fetch address. For example, at the start of the instruction fetching sequence described above, the CBP was initially set to one, indicating that the first entry in the PBT (BHT entry <1020,1028>) was being selected to match against the current instruction address. After instruction fetch address 1020 matches the branch address contained in the first entry of the PBT the CBP is incremented by one and set to two, indicating the BHT entry held in the second position of the PBT (BHT entry <1032,1050>) is the next BHT entry to be used to match the current instruction fetch address. By incrementing the CBP each time an instruction fetch block matches a PBT entry, the instruction fetching mechanism can sequentially follow the path of instructions predicted by the branch prediction mechanism.

The operation of a two level BHT is now presented according to the present invention. For simplicity of this description we assume that the two level branch history table divides a branch history table into two levels. That is, there is a small L1 BHT in the first level and a large L2 BHT in the second level and that the entries in each branch history table are similar. Additionally, the L1 BHT functions in the same manner that a one level branch history table functions. That is, the branch prediction mechanism uses the entries contained in the L1 BHT to predict the action (taken/not-taken) of each future branch encounter by the processor.

It is noted that this invention is not limited to just describing a two level branch history mechanism, but can easily be extended to describe a multi-level branch history mechanism where each successive higher (upper) level is larger than the previous lower level and branch prediction information is prefetched from a higher level to a lower level. For example, in a three level BHT the first level (lower level) of the BHT (L1 BHT) is again the small, active, very fast, branch predictor but each successive higher level of the branch history mechanism (L2 BHT, L3 BHT) is larger, than the preceding lower level BHT. That is, the L2 BHT is larger than the L1 BHT and is used to hold branch information that has aged out of the lower level BHT (L1 BHT), while the L3 BHT is larger than the L2 BHT and holds branch information that has aged out of the L2 BHT.

Additionally, the method used to prefetch branch information between the L2 BHT and the L1 BHT can easily be adapted to describe a prefetching mechanism between each successive level in a multi-level branch prediction mechanism. For example, in a three level branch history mechanism the prefetching mechanism can simultaneously be transferring branch history information between the L3 BHT and L2 BHT, and the L2 BHT to the L1 BHT.

The purpose of the two level BHT is to stay ahead of the prediction mechanism used by the L1 BHT by prefetching the necessary BHT entries into the L1 BHT. A key part of this prefetching mechanism is an independent and asynchronous branch prediction prefetching mechanism located in the L2 BHT that associates branch addresses (L2 BHT entries) to cache lines and then prefetches all of the BHT entries within a cache line into the L1 BHT.

This is achieved by allowing the decoder 105, instruction fetching mechanism 400, branch prediction mechanism 200, and L2 BHT prefetching mechanism to operate asynchronously from one another and at different rates of operation.

The L2 BHT prefetching mechanism must stay ahead of the L1 BHT branch prediction mechanism or unnecessary miss prediction errors will occur due to late BHT entry prefetches. Similarly, the L1 BHT branch prediction mechanism must stay ahead of the instruction fetching mechanism, and the instruction fetch mechanism must stay ahead of the decoder to avoid pipeline stalls.

For example, consider a superscalar processor that can decode two instructions per cycle.

If each instruction is four bytes, then the decoder will consume 8 bytes from the instruction buffer per cycle. In order to stay ahead of the decoder, the instruction fetching mechanism must get several instructions per fetch. Typically instructions are fetched in groups or blocks, called an "I-fetch-block". Here, an I-fetch-block is 16-bytes. Thus four instructions can be fetched every cycle.

The branch prediction mechanism will also search for branches within a block, called a "b-predict-block". In order for the branch prediction mechanism (L1 BHT) to stay ahead of the instruction fetching mechanism, it is desirable that the b-predict-block be larger than the I-fetch-block. Here, the L1 BHT prediction width is 32-bytes. To aid the branch lookup mechanism in the L1 BHT, each row (congruence class) is organized to contain all branches with the same 32 bytes "b-predict-block". Thus in one cycle an entire row can be searched and all branches within the same 32 byte block can be detected.

The prefetching mechanism used in the L2 BHT must stay ahead of the branch prediction mechanism in L1 BHT. This requires the L2 BHT prefetching mechanism to prefetch BHT entries in blocks larger than the L1 BHT branch prediction mechanism. These blocks are called "b-prefetch-blocks" and are 128 bytes long. The b-prefetch-block size is the same as a cache linesize.

Cache misses are a major cause of pipeline stalls. By tying the b-prefetch-block to the linesize of the cache, the L2 BHT prefetching mechanism has time to prefetch the necessary BHT entries into the L1 BHT in advance of their use by the branch prediction mechanism. Note, typically the processor will be stalled after a cache miss. The L2 BHT prefetching mechanism is able to take advantage of these stalls by prefetching BHT entries into the L1 BHT.

Thus in one cycle, the L2 BHT can search for all branches within a cache line (128 bytes). The branch prediction mechanism in the L1 BHT will then need four cycles to search for all branches within a cache line. The instruction fetching mechanism will need 8 cycles to fetch all of the instructions with a cache line. And, the decoder will need at least 16 cycles to decode all of the instructions within a cache line. Note, this search sequence is a best case behavior and removes extra search and fetch patterns due to breakage caused by taken branches.

Thus, this process can, in principle, be continued indefinitely, and the L2 BHT prefetching mechanism can get farther and farther ahead of the branch prediction mechanism in the L1 BHT and still farther ahead of the instruction fetching mechanism and decoder. Of course, this process is limited by the practical and physical sizes of the instruction buffers, BHT size, miss-prediction rates, etc.

Figure 7:
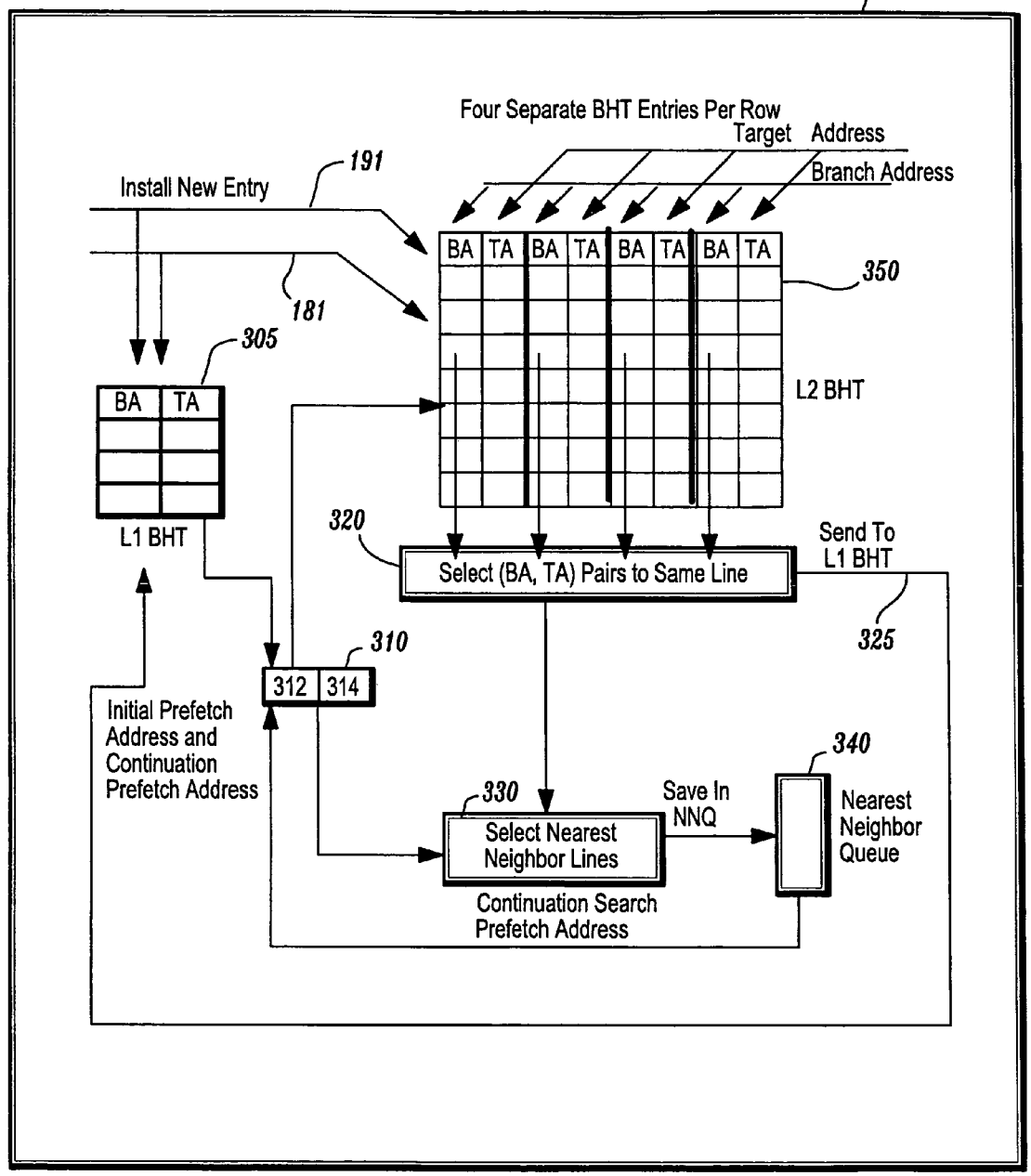
FIG. 7 is a functional block diagram of a Two Level Branch History Table (TLBHT)

FIG. 7 shows the structure and operations of a two level BHT 300. The two level branch history table replaces the operations of a convention BHT in a processor. It should be noted that there are many designs for a two level branch history table. The one presented here is chosen for simplicity of exposition rather than optimality of design. Ideally, the L1

BHT and L2 BHT would be much larger than the ones presented here. For example, the L1 BHT might have 2K entries while the L2 BHT contains 32K entries.

The figure shows a BHT divided into two parts: a L1 BHT 305 and a L2 BHT 350. Each table is an array of entries with the L1 BHT containing four entries, each a <BA,TA> pair. The L2 BHT consists of 32 entries, arranged as 8 rows and 4 <BA,TA> pairs per row. The L2 BHT presented represents a set-associative implementation where the rows are called congruence classes and each column represents a set of entries within a congruence class.

In a processor with a two level BHT, the job of the L2 BHT 350 is to hold those BHT entries that can not fit in the L1 BHT 305 due to size limitations and predict (prefetch) the sequence of probable BHT entries that the processor needs in order to avoid delays.

The methods used to install new entries in an L1 BHT 305 and L2 BHT 350 will now be discussed. Typically, the L1 BHT and L2 BHT install a new entry whenever a branch prediction error occurs. Whenever there is a branch prediction error, the L1 BHT is updated with a new BHT entry via paths 181 or 191. Recall, the decoder 105 will send branch prediction error information to the branch prediction mechanism via path 181, while the execution unit 151 will send any branch prediction error information via path 191. The new entry contains the branch address and correct target address of the branch prediction error. This information is also sent to the L2 BHT 350. The L2 BHT searches its directory to determine if the BHT entry (correct branch address and target address) already exists. If a matching entry is found (both branch address and target address match), no update is necessary. However, if a BHT entry is found with only a matching branch address but a differing target address, the target address is updated to reflect the new branch target. Finally, if no BHT entry is found, a new entry is installed. It is noted that there are many alternative methods for installing L2 BHT entries. For example a L2 BHT entry can be installed from BHT entries that age out of the L1 BHT.

The method used to prefetch L1 BHT entries is now discussed. Typically, a prefetch is triggered whenever the L1 BHT is updated, i.e. a branch prediction error occurs. The L1 BHT 305 sends the L2 BHT 350 an initial prefetch address 310 to begin prefetching whenever the L1 BHT needs to install a new BHT entry or update the contents of an existing entry. The initial prefetch address sent to the L2 BHT is the predicted target address of the new L1 BHT entry just installed. The initial prefetch address signals the L2 BHT where to begin searching for L2 BHT entries that should be sent (prefetched) to the L1 BHT.

The initial prefetch address is divided into two parts: A high order portion 312 and a low order portion 314. The high order portion identifies the cache line address of the initial prefetch address. This portion of the address is used to select the row (congruence class) of the L2 BHT to search for BHT entries to send (prefetch) to the L1 BHT and a tag field used to match the branch address field contained in the BHT. Note, typically a certain number of bits from the high order portion are selected (modulo the number of congruence classes in the L2 BHT) to determine the row number of the L2 BHT to examine.

All of the L2 BHT entries within the selected congruence class are examined and compared against the initial prefetch address. That is, the high order portion 312 of the initial prefetch address 310 is compared against each corresponding high order portion of the branch address field of the L2 BHT entries within the selected congruence class. All L2 BHT entries with matching high order branch address fields will be sent to the L1 BHT. Note, these entries identify <BA,TA> pairs that have their branch address (field 1 of the L2 BHT entry) residing in the same cache line as the initial prefetch address.

The low order portion 314 of the initial prefetch address identifies the bytes within the cache line that contains a branch. Their use will be described below.

The high order portion of the initial prefetch address is supplied to the L2 BHT where it is compared against the L2 BHT entries in the selected congruence class using compare logic 320. Note, only the high order portion of the BA fields of the L2 BHT entries are used to determine if a match exists.

The L2 BHT will transfer all entries to the L1 BHT via path 325, whose branch address maps to the same cache line identified by the initial prefetch address. The L2 BHT prefetching mechanism will then attempt to identify additional L2 BHT entries that should be sent to the L1 BHT. Additional L2 BHT entries can be found in the 'nearest neighbor' lines identified by the entries just sent to the L1 BHT. Nearest neighbor lines are identified using select logic 330. These nearest neighbor lines will be used to generate 'continuation prefetch addresses' and are calculated from the predicted target address of the L2 BHT entries just sent to the L1 BHT and fall into two categories:

1. The next sequential line following that of the initial prefetch address, and
2. The cache lines identified by a predicted target address of an entry sent to the L1 BHT that is not to the same cache line or next sequential cache line identified by the initial prefetch address.

Figure 8:
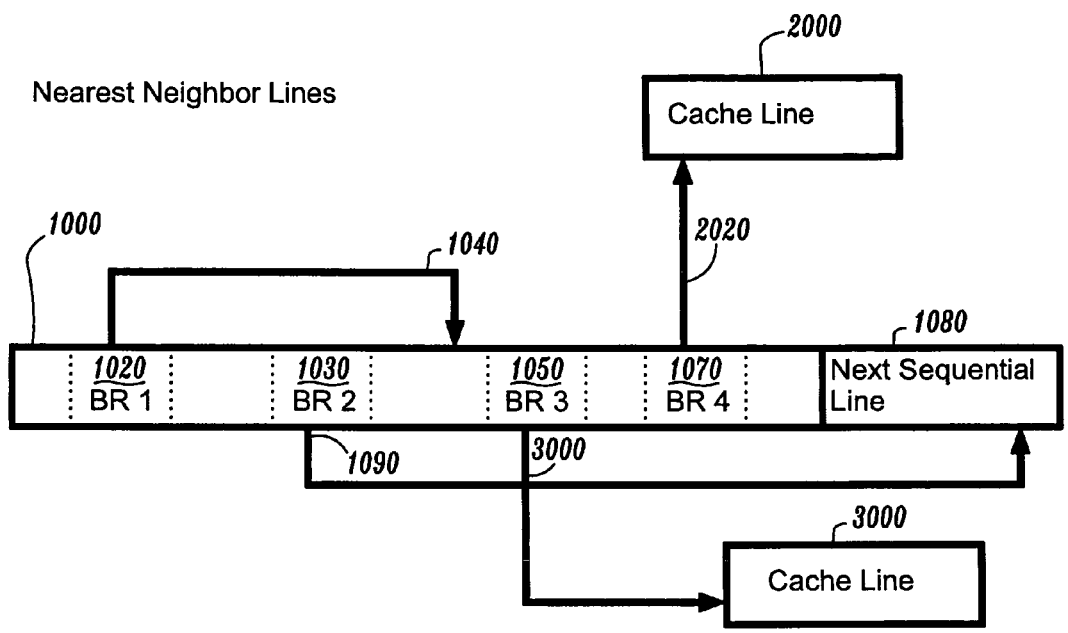
FIG. 8 is a diagram illustrating branches in a cache line pointing to nearest neighbor lines.

FIG. 8 illustrates the concept of nearest neighbor lines. The figure shows four cache lines, where a cache line is 128 bytes. The address of the lines are 1000 (hex), 1080 (a next sequential line), 2000, and 3000. There are 4 branches in line 1000. Branch 1 branches within the same line, to address 1040. Branch 2 branches to the next sequential line, address 1090. Branches 3 and 4 branch to new cache lines, addresses 3000 and 2000 respectively. The branches that identify nearest neighbor lines are 2, 3, and 4. Note, the next sequential line is always a nearest neighbor line regardless whether a branch within the cache line branches to it.

Figure 9:
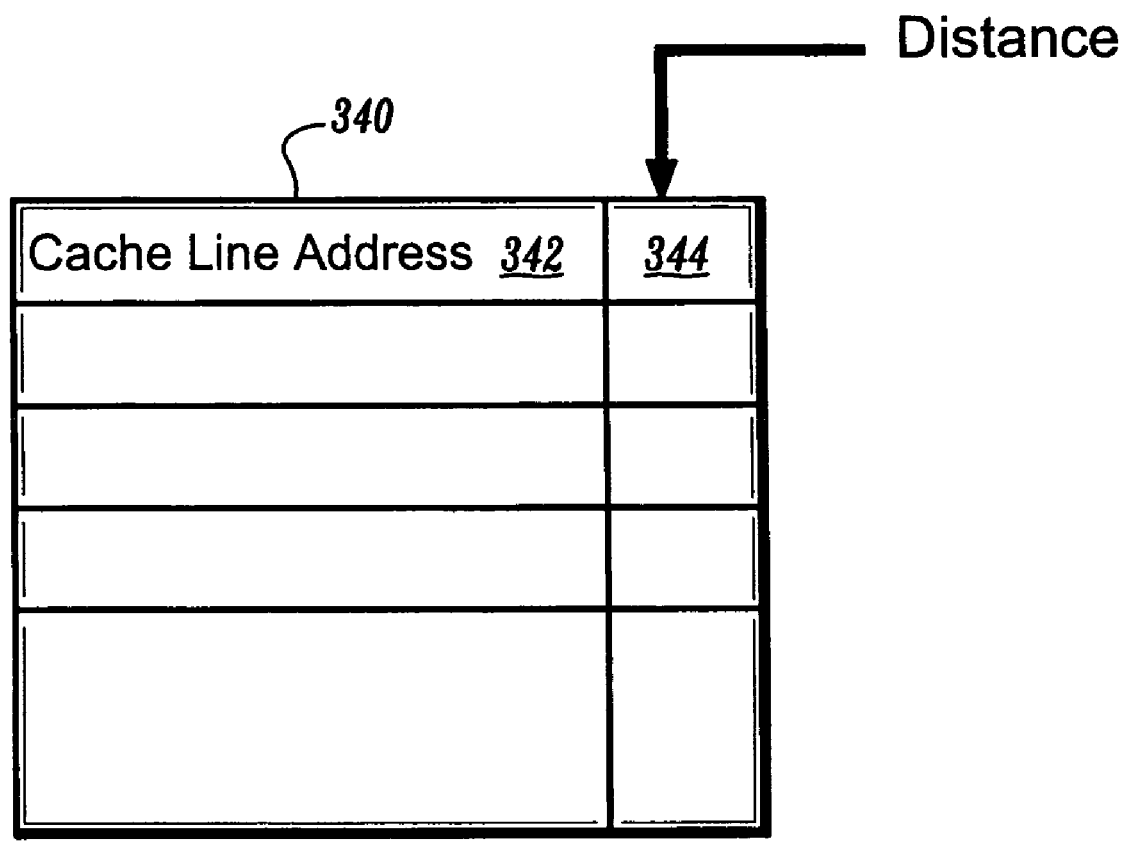
FIG. 9 illustrates the structure of the nearest neighbor queue.

Returning to FIG. 7, the addresses of the nearest neighbor lines are saved in the Nearest Neighbor Queue (NNQ) 340. These are addresses 1080, 2000, and 3000. FIG. 9 gives a description of the NNQ 340. Each entry in the NNQ contains the following two fields:

1. Cache line address 342, This is the address of the nearest neighbor lines identify by the initial prefetch address or future prefetch addresses.
2. Distance 344, Denotes a distance (number of nearest neighbor lines) that link the initial prefetch address and its corresponding cache line address (field 1 in the NNQ). All nearest neighbor lines identified from the initial prefetch address will have their distance value initially set to 1. All nearest neighbor lines identified from a continuation prefetch address will have their distance set to one greater than the distance of the corresponding continuation prefetch address.

The entries in the NNQ 340 will be used to search for additional L2 BHT entries to send to the L1 BHT. Each cache line address 342 (field 1) identifies a nearest neighbor line and serves as a 'continuation prefetch address'. These addresses will be used to search the L2 BHT for additional entries to send (prefetch) to the L1 BHT. It is noted that there may be many other branches elsewhere in the program but only the nearest neighbor lines and the L2 BHT entries contained within these lines are immediately reachable.

There are many algorithms for adding entries to the NNQ 340. The method described here is for simplicity and is biased towards placing the address of the nearest neighbor line identified by the first taken branch that will be encountered after the initial prefetch address at the head of the queue while placing the remaining nearest neighbor addresses at the bottom of the queue. Nearest neighbor lines are identified by subtracting the initial prefetch address from the address of each branch instruction found within the same cache line determined by the initial prefetch address. Note, the address of each branch instruction is contained in a <BA,TA> pair contained in the L2 BHT. The first or 'nearest' nearest neighbor line will have the smallest positive difference (including zero) among the entries saved in the L2 BHT. Additional nearest neighbor lines are inserted into the NNQ according to their positive difference (in increasing order) followed by the L2 BHT entries that have a negative difference (in decreasing order). The address saved at the head of the NNQ will be selected as the next continuation prefetch address. This ensures that priority is given to prefetching the nearest neighbor lines along the predicted path of a program and 'filling in' the branches contained in the additional nearest neighbor lines as time allows.

By allowing the L2 BHT prefetching mechanism to continue to search and prefetch all L2 BHT entries that are contained in the nearest neighbor lines we increase the probability that the L2 BHT can prefetch entries into the L1 BHT before they are needed. The L2 BHT prefetching mechanism will then continue to prefetch all nearest neighbor entries identified from these searches. These nearest neighbor lines will be used as new starting addresses for new L2 BHT searches. This process will continue until the next L1 BHT initial prefetch address is sent to the L2 BHT or until it is determined that the L2 BHT has prefetched a predetermined number of lines ahead of the initial prefetch address. Typically, values for maximum prefetch distances are 5 or 6 depending on the L2 BHT search line size and the amount of information (bandwidth) that can be transferred between the L2 BHT and L1 BHT.

An example of the L2 BHT prefetching mechanism is described using FIG. 8. The figure shows a cache line at address 1000 (hex) with four branches within the line.

| | | | | |
|---|---|---|---|---|
| BR1 = branch address | 1020 | predicted target address | 1040 |
| BR2 = branch address | 1030 | predicted target address | 1090 |
| BR3 = branch address | 1050 | prediction target address | 3000 |
| BR4 = branch address | 1070 | predicted target address | 2020 |

Let all four branches have their corresponding entry saved in the L2 BHT, then all four entries will reside in the same congruence class because they are in the same cache line.

Let the initial prefetch address be 1040, then the L2 BHT will be searched for any BHT entries that reside in the same cache line. Four BHT entries are found in the cache line. These entries are sent to the L1 BHT, e.g. <1020,1040>, <1030, 1090>, <1050, 3000> and <1070,2020>. Three nearest neighbor lines are identified: 1080, 2000, 3000. These addresses are saved in the nearest neighbor queue with their distance value set to 1.

Using the insertion method described above, the order of insertion is: address 3000 is placed at the head of the NNQ, while address 2000 followed by 1080 are placed at the bottom of the NNQ. Assuming the NNQ was initially empty, these will be the second and third entries in the NNQ.

The L2 BHT prefetching mechanism will then continue to search for entries to send (prefetch) to the L1 BHT using the entries in the NNQ. Each address saved in the NNQ will be used as a continuation prefetch address. Each continuation fetch will be used to search the L2 BHT in exactly the same manner as the initial prefetch address. That is, all L2 BHT entries residing in the same cache line as a continuation prefetch address will be sent to the L1 BHT and the address of all nearest neighbor lines from the continuation prefetch address will be sent to the NNQ.

There is very little difference between the initial prefetch address and a continuation prefetch address as far as searching the L2 BHT. Both addresses are used to search the L2 BHT in exactly the same manner and all entries residing within the cache line identified by these addresses are sent to the L1 BHT. In fact, each continuation prefetch address will be used to identify additional nearest neighbor lines in the same manner as the initial prefetch address.

The main difference is in calculating distance values for NNQ entries. All nearest neighbor lines identified from the initial prefetch address are placed in the NNQ with a distance value of one. All nearest neighbor lines identified from a continuation prefetch addresses are assigned a distance of one greater than the distance associated with the corresponding continuation prefetch address.

Using the example above, when nearest neighbor line 1080 (contained in the NNQ) is used to search the L2 BHT, any nearest neighbor lines identified from this continuation prefetch address are sent to the NNQ with distance two. This is one greater than the current distance value for address 1080. This process will continue until the next L1 BHT initial prefetch address is sent to the L2 BHT or until it is determined that the L2 BHT has prefetched a predetermined number of lines ahead of the initial prefetch address. This can be determined by examining the value of the distance parameter for each continuation prefetch address saved in the NNQ. For example, a continuation prefetch request might be allowed for all nearest neighbor lines with distance less than five.

By allowing the L2 BHT prefetching mechanism to continue to process nearest neighbor lines, the 'timeliness' (amount of time between an entry being prefetched and its actual use by the branch prediction mechanism) of each prefetch can be increased. The cache prefetching mechanism, described below, takes advantage of this feature to remove much of the memory latency associated with instruction cache misses.

In summary, the prefetching process described above will continue until it is determined that the continuation prefetch requests have reached a certain distance from the initial prefetch address (measured by the number of nearest neighbor lines from the initial prefetch) or, a branch misprediction has occurred in the L1 BHT. At this point, the L1 BHT sends the correct target address to the L2 BHT, and the prefetching process is re-started from the correct target address (an initial prefetch address) and again proceeds forward.

In order to eliminate the need for unnecessary L2 BHT prefetch searches, the L2 BHT will retain the last n distinct prefetch cache lines searched, where n is set according to design constraints. Only nearest neighbor lines that are not contained in the last n distinct lines examined will be searched for additional BHT entries to send to the L1 BHT. This will avoid redundant searches of nearest neighbor lines that were searched in previous cycles. For example, if the initial L2 BHT search address is to line A and it contains an entry that branches to line X, then line X will be searched for branches using the nearest neighbor algorithm. If line X contains a branch back to line A, we can avoid searching line A for branches if we retain the addresses of at least two cache lines that were previously searched for branches.

A similar filter mechanism is used by the L1 BHT to avoid sending unnecessary initial prefetch addresses to the L2 BHT. That is, the L1 BHT will retain the last n update addresses sent to the L2 BHT and only send initial prefetch addresses that are not contained in the set of n previous initial prefetch addresses. This will avoid unnecessary restarts of the L2 BHT prefetch mechanism.

By allowing the L2 BHT to quickly transfer multiple entries per cycle into the L1 BHT, it is possible to stay ahead of the branch prediction search mechanism carried out by the L1 BHT.

A general description of a two level BHT and a mechanism to transfer (prefetch) BHT entries between the L2 BHT and L1 BHT has been given above. Next, a mechanism is described that uses a two level BHT to prefetch cache lines of memory into the cache.

As mentioned above, the purpose of the two level BHT is to stay ahead of the prediction mechanism used by the L1 BHT by prefetching the necessary BHT entries into the L1 BHT. The two level BHT is successful because it can anticipate which entries are needed by the L1 BHT and it runs ahead (in time) of the L1 BHT. Typically, the L2 BHT can send the L1 BHT new entries that are needed to predict the outcome of future branches that the processor will encounter. Similarly, the processor's branch prediction mechanism is successful (as seen from the L1 BHT) because it can predict the outcome of branches (both direction and action) well ahead of the processor's instruction fetching mechanism. Additionally, the L1 BHT will predict the outcome of a branch even before the instruction fetching mechanism has fetched the branch from memory. These properties also allow the two level BHT to anticipate future cache accesses and prefetch lines of memory into the instruction cache.

A general description of the operations and modifications of the two level BHT is set forth, with a more detailed description given below. The following modifications are made to the two level BHT.

Figure 10:
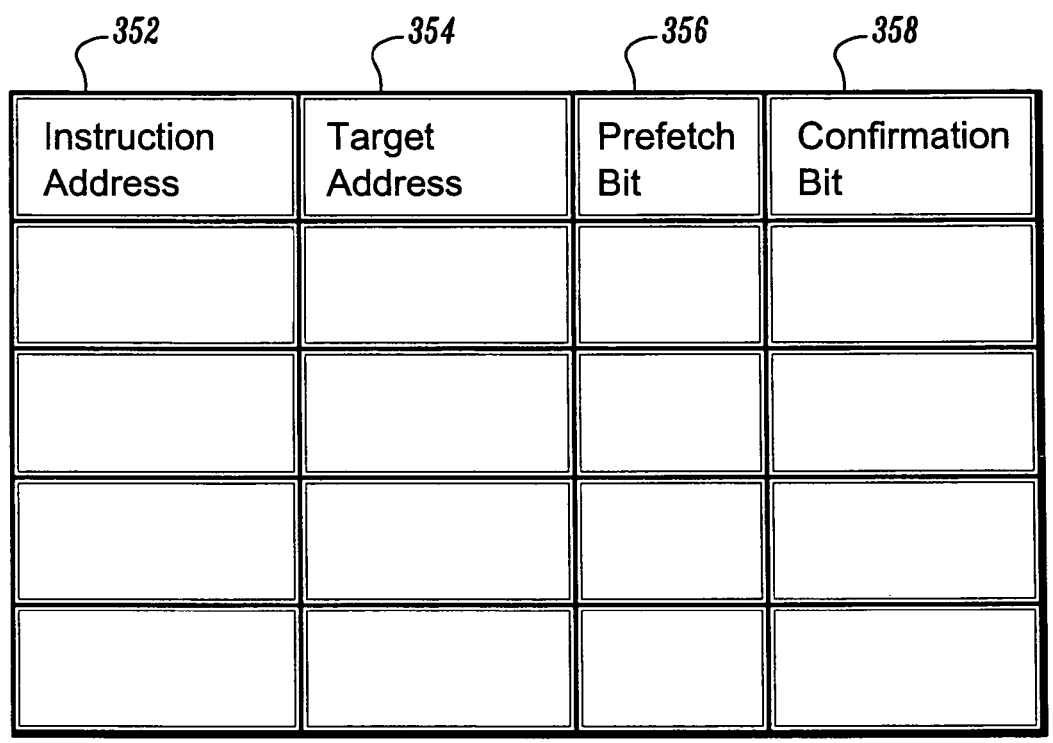
FIG. 10 illustrates the structure of the L2 Branch History Table.

The following modifications are made to the L2 BHT described above. FIG. 10 shows an L2 BHT 350 where each entry contains four fields:

1. The address of a branch instruction 352

2. The address of the target address 354 associated with the branch identified in field 1.

3. A prefetch bit 356 indicates if the cache line associated with the target address (field 2) is a candidate for prefetching. A value of 1 indicates that the cache line identified by the target address field has caused a cache miss in the past and should be prefetched the next time this entry is selected. A 0 indicates that no cache miss has been identified with the target address of this BHT entry.

4. A confirmation bit 358 indicates if the entry has correctly predicted previous prefetches. A value of 1 indicates that the last prefetch triggered by the corresponding L2 BHT entry has been used and future prefetches should continue to be attempted whenever this entry is referenced. A 0 indicates that the last prefetch was not used. The line identified by the target address will not be prefetched. Ideally, the value of the confirmation bit will avoid wasting any processor resources caused by prefetched lines that are not used and allows only useful prefetches to occur.

Note, the terms 'on' and 'off' will be used interchangeably with the values of 1 and 0, respectively, when describing the values of the confirmation bit or prefetch bit. For example, the term 'on' will be used to describe when the value of the confirmation bit or prefetch bit is 1, and 'off' will be used to describe when these fields are 0.

The L2 BHT entries are set (or updated) whenever a branch prediction error occurs. This information is also sent to the L1 BHT. Whenever a new entry is made in the L2 BHT the instruction address 352 and target address 354 fields of the L2 BHT are set equal to the corresponding branch address and target address field of the L1 BHT. The prefetch bit 356 and confirmation bit 358 are initially set to the off state (0).

FIG. 11 summarizes the values and actions for the different settings of the confirmation bit 358 and prefetch bit 356. Whenever an L2 BHT entry is referenced (prefetched to the L1 BHT), the corresponding values of the confirmation bit and prefetch bit are examined. Depending on their values, there are three types of actions that can occur. These actions are no prefetch, prefetch-data or fetch-no-data.

If the prefetch bit 356 is 0, no prefetch can occur regardless of the value of the confirmation bit.

If the prefetch bit 356 is turned 'on' and the confirmation bit 358 is turned 'off' then a fetch-no-data prefetch signal is sent. In this case, no actual prefetch occurs. That is, no line of memory is transferred to the cache. However, the address of the prefetch (the line identified by the target address 354) is saved to determine if this line should be prefetched in the future. Note, a fetch-no-data signal is the result of a prior prefetch being issued and the data was not used. When this event occurs, the confirmation mechanism is trying to avoid unused prefetches. This action will be discussed more fully below.

If the confirmation bit 358 and prefetch bit 356 are both turned 'on', a prefetch will occur. The line that is prefetched will either be the line addressed by the target address of the <BA,TA> pair or the line following the target address (next sequential line). The following algorithm determines which line to prefetch:

1. The line address portions of the branch address and target address of the referenced <BA,TA> pair are compared.

2. If the values disagree (are not equal) the line specified by the target address field is prefetched. Alternatively, if the line address portions are equal, the line following the target address is prefetched (the next sequential line).

The mechanism used to set the confirmation bit and prefetch bit is now discussed. The L2 BHT prefetching mechanism tries to identify the L2 BHT entry (the branch address from a <BA,TA> pair) whose target address 'points' to the miss. Thus, during the normal process of prefetching L2 BHT entries to the L1 BHT, any L2 BHT entries with their prefetch bit and confirmation bit set to '1' will cause a cache line to be prefetched.

The branch address associated with the miss address is the last branch used by the instruction fetching mechanism that matched an instruction fetch block. Recall, the instruction fetching mechanism follows the sequence of instructions saved in the predicted branch table. The L2 BHT prefetching mechanism then uses this address (the branch address from a <BA,TA> pair) to locate the <BA,TA> pair in the L2 BHT. Ideally, the miss address will match the line identified by the target address and the confirmation bit and prefetch bit are set to '1'. This identifies all L2 BHT entries where the branch instruction branches to a new line and the new line caused a cache miss.

However, sometimes the miss address will not match the line identified by the target address. Typically this occurs for those BHT entries (<BA,TA> pairs) where the branch instruction branches within the same line and the branch instruction is the last taken branch in the line. When this occurs, if the miss address specifies the line following the target address, the confirmation bit and prefetch will be set. For these BHT entries the line following the line specified by the target address will be prefetched.

The following example will illustrate this process. Consider two sequential cache lines with a linesize of 128 bytes: address 1000 (hex) and 1080 (hex). Let the last taken branch in a line be located at 1040 (hex) and let it branch to location 1070 (hex). This is represented as L2 BHT entry <1040, 1070>. The instruction fetching mechanism will make a series of instruction fetches up to address 1040 and then continue fetching at location 1070. If there are no more predicted branches in the predicted branch table, the instruction fetching mechanism will continue to make a series of next sequential fetches and issue a fetch for the next line, 1080 (hex). If this fetch causes a cache miss (line address 1080), the cache line prefetching mechanism will recognize that the BHT entry represents a branch that branches within the same cache line and set the confirmation bit and prefetch bit to '1'. When this entry is prefetched to the L1 BHT the line following the target address is prefetched.

Figure 12:
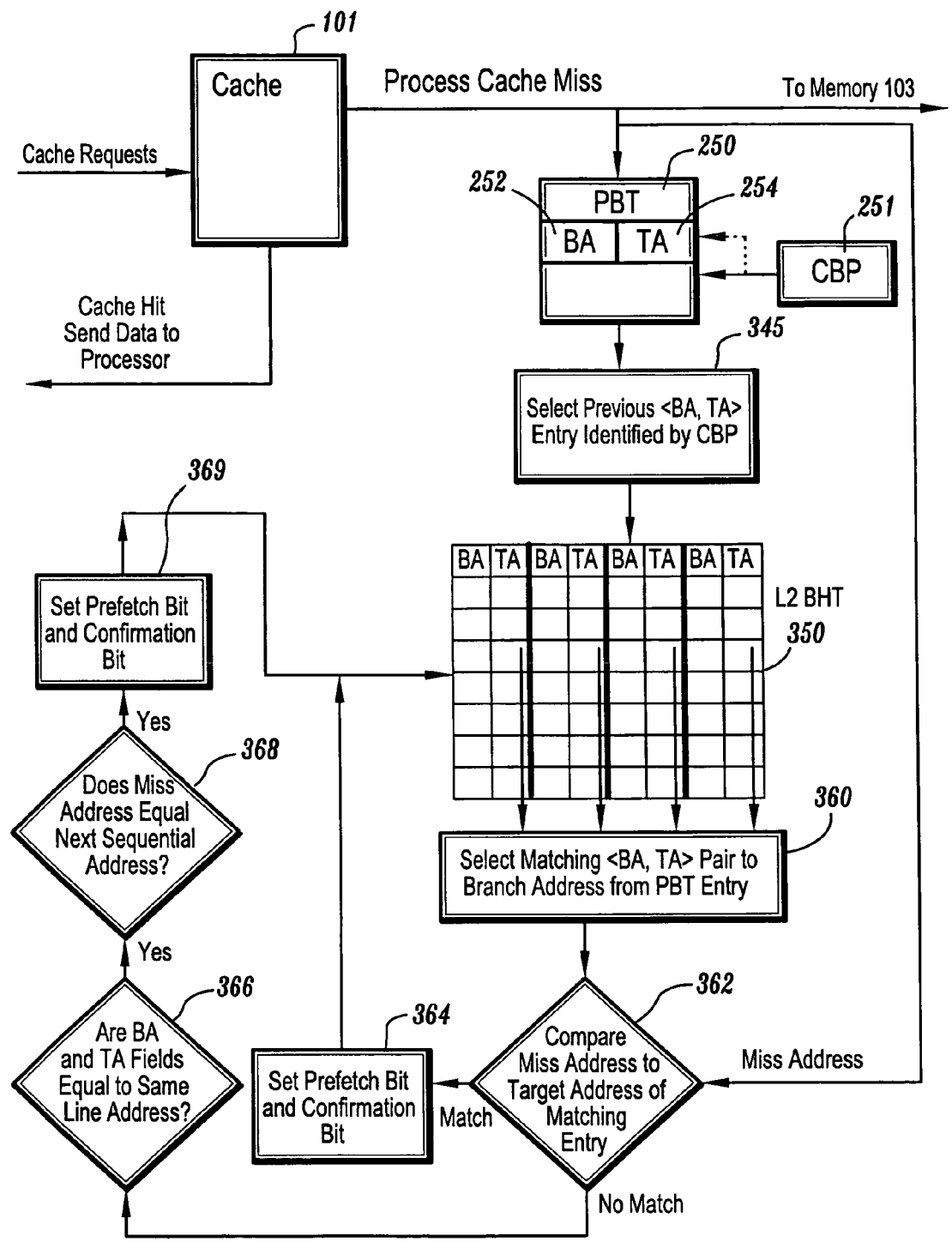
FIG. 12 is a function block diagram of a mechanism used to set the confirmation bit and prefetch bit in a Two Level Branch History Table (TLBHT)

FIG. 12 illustrates the process of setting the prefetch bit and confirmation bit discussed above. The figure shows the events associated with a cache processing requests (instruction fetches and data fetches) from the processor. As cache requests are sent to the cache 101, all cache hits are returned to the requesting unit. If a cache request is not in the cache, (a miss) then the information is requested from memory 103.

When a miss occurs the instruction fetching mechanism is notified. There the last BHT entry in the PBT 250 that matched an instruction fetch block address is sent to the two level branch history table 350. This PBT entry (a <BA,TA> pair) is identified as the entry prior to the entry pointed to by the current value of the CBP 251. Recall, the CBP 251 points to the entry in the PBT that currently is being used to detect when an instruction fetch block contains the address of a upcoming predicted branch and redirect the instruction fetching sequence to the target address of that branch. Select logic 345 identifies the entry in the PBT and sends <BA,TA> information to the L2 BHT 350.

It is noted that, on occasion, the CBP can point to the first entry in the PBT. If a miss occurs and the CBP is pointing to the first entry in the PBT, the <BA,TA> pair sent to the two level branch history table is the branch that initiated the instruction fetch and branch prediction process. This is typically identified as the branch that started a pipeline restart.

The branch address 252 field from the selected <BA,TA> pair in the PBT is then used to search L2 BHT 350 for all BHT entries with matching branch address fields. Select logic 360 compares the entries from the L2 BHT and selects those with matching branch address fields. If a match is found, the line address portion of the miss address is compared against the line address portion of the target address field of all matching entries using select logic 362. If the line address portions agree, the confirmation bit and target address of the matching entries are set to '1' using logic 364 and the results are rewritten back into the L2 BHT. Note, these L2 BHT entries represent <BA,TA> pairs where the target address field identifies (points to) a miss that has just occurred. When these BHT entries are re-selected and prefetched to the L1 BHT a prefetch of a line of memory into the cache will occur.

If the line portions of the miss address and target address did not match, then the line portions of the branch address 352 and target address field 354 of the selected L2 BHT entries are compared to determine if they are equal. If they are equal, the L2 BHT entry identifies a <BA,TA> pair where the branch branches within the same line. For these BHT entries, the miss address can not equal the target address, since the branch address and target address and the <BA,TA> pair are in the same line. Compare logic 368 determines if the miss address identifies the line following the line containing the branch address in the <BA,TA> pair, the next sequential line. If the miss address is to the next sequential, the confirmation bit and prefetch bit are set to '1'.

Note, if the miss address does not match the line portion of the target address or the next sequential address, the confirmation bit and prefetch bit are not set. Note, this event should rarely occur, since there are only a small portion of the branches have changing target addresses. Thus, with high probability, all cache misses that identify matching <BA,TA> pairs in the L2 BHT will have their corresponding prefetch and confirmation bit set to '1'.

It is an implementation decision to set the confirmation bit to 1 when the prefetch bit is set to 1. By setting the confirmation bit to 1, the prefetch mechanism is biased towards prefetching, even when there is no history about the success or failure of prefetches that originate from this L2 BHT entry. Alternatively, the confirmation bit can be left 'off' when the prefetch bit is initially turned 'on'. Under this implementation, the confirmation mechanism (described below) will turn the confirmation bit 'on' after is has been determined that the L2 BHT entry can produce prefetches that will be used. Under this implementation a <BA,TA> pair would have to demonstrate twice that useful prefetches could occur before any 'real' prefetch would occur.

To aid in prefetching, an Active Prefetch Queue (APQ) is also added to the L2 BHT. There are two reasons an APQ is added to the L2 BHT prefetching mechanism:

1. Avoid unused prefetches: A confirmation mechanism is used to verify that each prefetched line is actually used and tries to eliminate unnecessary prefetches in the future.

2. Improve performance: Line buffers are added to hold those lines of memory that were transferred from the memory to the cache as a result of a prefetch request, and not as the result of a normal cache miss. Note, when a cache design provides for prefetching, two types of misses may occur: prefetch misses and demand (or normal) misses. A prefetch miss is one where a predicted target address from the L2 BHT is not in the cache. In this instance, the line is requested from memory and sent to the APQ. It will be transferred to the cache only when it is used by the processor. On the other hand, a normal miss (or demand miss) is a cache miss that was not a cache prefetch. In this instance, the line of memory that is returned after the miss is sent directly to the cache and is not written into the APQ. The demand miss is the result of a normal instruction fetch request generated by the instruction fetching mechanism.

Figure 13:
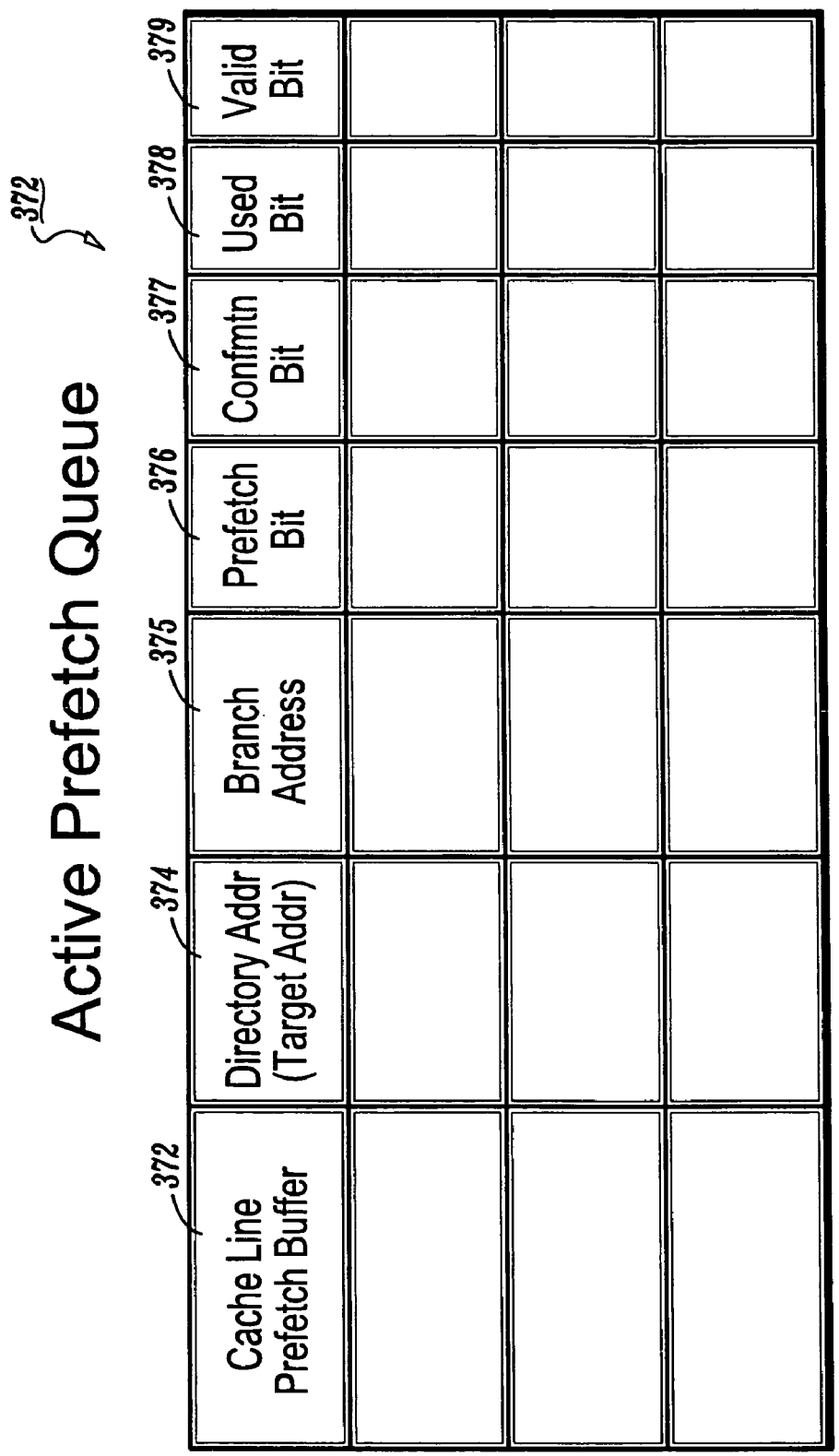
FIG. 13 illustrates the structure of the active prefetch queue.

FIG. 13 shows the format of the APQ 370. The figure shows that each entry contains seven fields.

1. A Cache line buffer 372, This line buffer holds the line of memory prefetched into the APQ until it is used by the processor or is overwritten by another prefetch.

2. A Directory Address 374, This field identifies the address of the prefetched line. This field is also the predicted target address of the L2 BHT entry that caused the prefetch.

3. A Branch Address 375, This field equals the branch address of the L2 BHT entry that caused the prefetch.

4. Prefetch Bit 376, Records the value of the prefetch bit of the L2 BHT entry that caused the prefetch.

5. Confirmation Bit 377, Records the value of the confirmation bit of the L2 BHT entry that caused the prefetch.

6. Used Bit 378, Identifies if a prefetch is used or unused. Initially the bit is set to 0 when the line is prefetched. The bit is changed to 1 if a cache miss matches a directory address (field 2) saved in the APQ. Note, for a prefetch to be used, a cache miss request must find the address of the miss in the directory field (field 2) on an APQ entry.

7. Valid Bit 379 Indicates which entries in the APQ contain valid information. By convention a 1 indicates that the entry contains valid information and a 0 indicates the entry is invalid.

Cache line buffers are well known in the art and increase processor performance. There are several reasons why lines returned from memory 103, as a result of a prefetch miss, should be sent to a prefetch buffer, and not loaded directly into the cache 101.

First, prefetches are a guess or prediction that a line will be used by the processor. If prefetched data is copied directly into the cache 101, then the cache's replacement algorithm must discard a line already in the cache. If the prefetched data is unused while in the cache (until replaced by a future miss or prefetch), then the cache has been contaminated with useless lines, thus wasting valuable cache space.

Second, if the prefetched line is copied in the cache 101, and the line that was replaced is re-referenced before the prefetched line is referenced, then an additional cache miss occurs.

Third, the prefetch buffers can be implemented in the same technology as the cache and placed near the cache. Thus, an access that is found in the prefetch buffer can be satisfied in approximately the same amount of time as a cache hit.

Fourth, if the prefetch line is copied in the cache, then cache references may be blocked during the line transfer cycles. Recall, that if the cache linesize is 128 bytes and the transfer bus is 16 bytes wide, then 8 cycles are required to transfer the line from the memory 103 into the cache 101. During this period a cache request from the instruction fetch controls or operand fetch controls may be blocked because the cache arrays are unavailable.

The APQ 370 is used to hold the lines of memory that were prefetched and information contained in the BHT entries that caused a prefetch. There are two types of prefetches that can occur depending of the values of the prefetch bit and confirmation bit. These are prefetch-data and fetch-no-data. These types will be described fully below.

Again, the APQ will include an LRU field (not shown) that records the age of each entry.

The LRU field is used to select an entry for replacement when a new prefetch request is sent from the L2 BHT and all entries in the APQ are currently occupied.

A general description of the modifications to a two level BHT has been described. Next, a more detailed description of the overall operations and functions of a two level BHT that prefetches lines of memory into the cache is presented.

Figure 14:
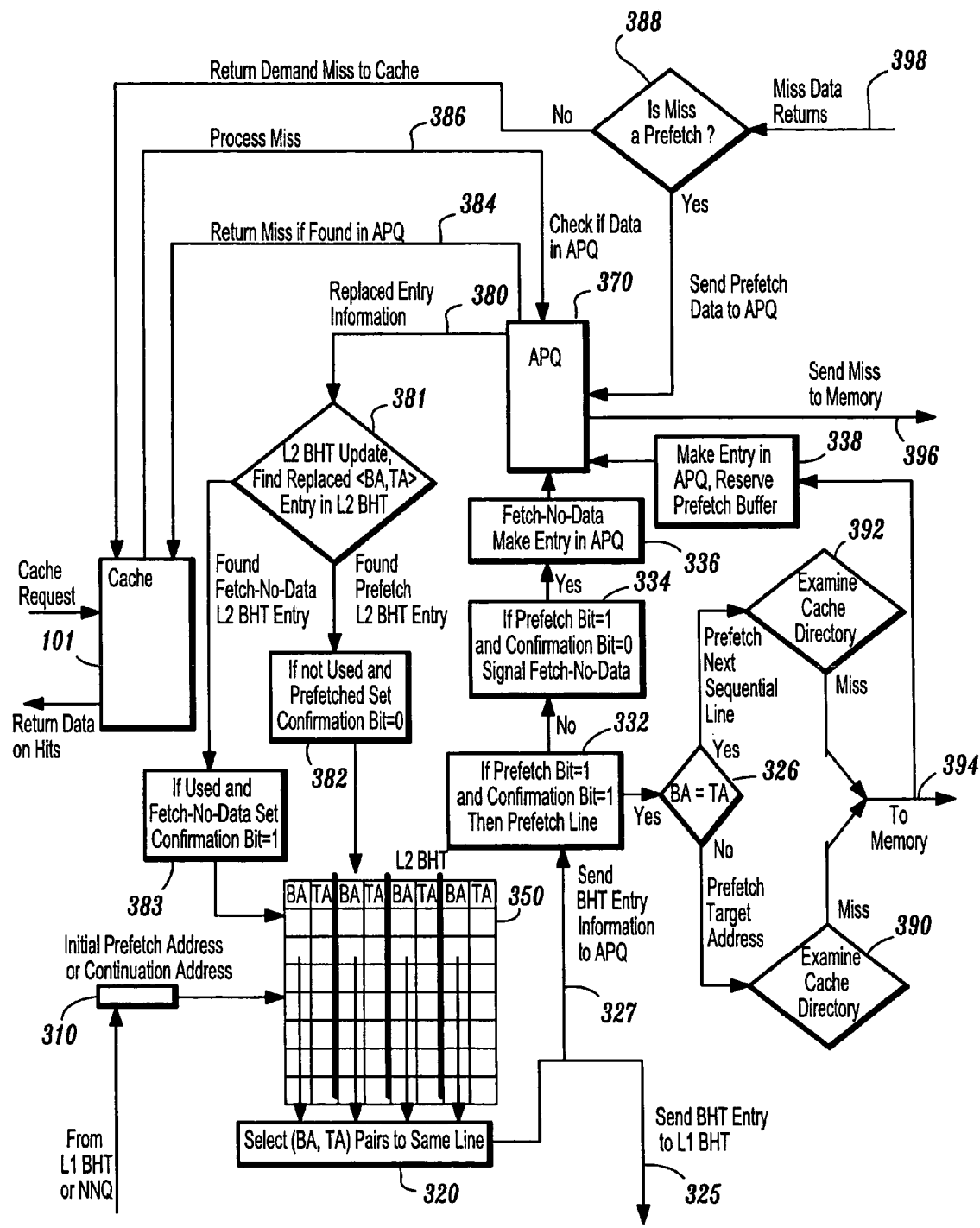
FIG. 14 is a functional block diagram of a mechanism used to prefetch lines of memory into the cache using a Two Level Branch History Table.

FIG. 14 and the accompanying description below illustrates the structure and operation of the two level BHT including the APQ. The figure shows the L2 BHT searched either by an initial prefetch address or continuation prefetch address 310. The initial prefetch address is sent from the L1 BHT whenever a branch prediction error occurs. Continuation prefetch addresses are sent from the nearest neighbor queue NNQ. Recall, continuation prefetch addresses are identified by the nearest neighbor lines and allow the L2 BHT prefetching mechanism to stay ahead (in time) of the L1 BHT branch prediction mechanism. L2 BHT entries found in the cache line identified by the initial prefetch address or continuation prefetch address (using select logic 320) are sent to the L1 BHT via path 325.

In parallel, the confirmation bit and prefetch bit associated with the <BA,TA> pairs sent to the L1 BHT are sent to select logic 332 and 334 via path 327. There it will be determined if a cache line should be prefetched or a fetch-no-data request (prefetch) should be issued. If the corresponding confirmation bit and prefetch bit of a selected <BA,TA> pair are 'on' (select logic 332), a prefetch request will occur. The line portions of the selected branch address and target address from the <BA,TA> pair are examined using compare logic 326. If they agree (are equal), the cache directory is examined to determine if the line following the target address is in the cache using compare logic 392. If it is not in the cache (a miss), the miss address is sent to the memory via path 394 and the line is prefetched.

If the line portions of the selected branch address and target address are not equal, the cache directory is examined to determine if the line identified by the target address is in the cache using compare logic 390. If it is not in the cache (a miss), the line identified by the target address is prefetched. The address of the prefetch is sent to the memory via path 394.

Whenever a prefetch occurs, an new directory entry is made in the APQ 370 using select logic 338. The line prefetch buffer is reserved in the APQ and the corresponding prefetch address (either the target address or line following the target address), and branch address are set to reflect the information contained in the <BA,TA> pair that caused the prefetch. Additionally, the confirmation bit and prefetch bit are set to '1' and the used bit is set to '0', indicating that the prefetch has not be used. The valid bit is set to '1'. Note, the used bit will be set to '1' if the processor actually requests the line.

When a new directory entry is made in the APQ the replacement algorithm used by the APQ must select an entry for replacement. Initially, the replacement algorithm will try to select any entry that has its valid bit marked invalid. If an invalid entry is found, the new entry can overwrite the existing fields. If all entries in the APQ have their valid bit set to '1' then the oldest entry in the APQ is selected for replacement. The replacement algorithm will examine the LRU field in the APQ to determine the oldest entry.

If the prefetch bit is 'on' and the confirmation bit is 'off' (select logic 334), a fetch-no-data prefetch request is made. Again, a new directory entry is made in the APQ 370 identifying this type of prefetch using select logic 336. That is, the replacement algorithm will select an entry for replacement. The directory address (field 374 of FIG. 13) of the selected APQ entry is updated to reflect the prefetch address (either the target address or line following the target address) and the branch address (field 375 FIG. 13) is set from the <BA,TA> pair. The prefetch bit and valid bit are set to '1', and the confirmation bit and used bit are set to '0'. However, a prefetch will not occur. The APQ controls only record the BHT entry (<BA,TA> pair) in the branch address 375 and directory address 374 fields of the APQ. Recall, a fetch-no-data prefetch is the result of a line that was prefetched in the past and not used. By recording the <BA,TA> pair that issued the fetch-no-data request in the APQ, it is possible to determine if the confirmation bit should be reset to '1' thus allowing this entry to produce useful prefetches. The confirmation bit will be reset to '1' if there is a demand miss that matches the directory address (field 374 in the APQ) in the APQ and it is entered with a fetch-no-data setting.

The mechanism to turn 'on' or 'off' the confirmation bit is now described. Whenever a new entry is made in the APQ, the prefetching confirmation mechanism determines if the <BA,TA> entry in the L2 BHT is producing useful prefetches. The confirmation mechanism will attempt to update the confirmation bit in the corresponding L2 BHT entry that initiated the prefetch to reflect the used/not-used status of the <BA,TA> pair just replaced in the APQ. The L2 BHT update logic 381 is supplied with the branch address and directory address of the <BA,TA> pair selected by the replacement algorithm (the APQ entry just replaced), and corresponding confirmation bit, prefetch bit, and used bit values via path 380. L2 BHT update logic 381 then examines the addresses (<BA,TA> pairs) saved in the L2 BHT to determine which entry initiated the prefetch. Note the matching L2 BHT entry will have the same branch address as the branch address just replaced from the APQ and the directory address will match the line portion of the target address or line following the target address.

If an L2 BHT entry is found and the replaced entry from the APQ was due to a fetch-no-data prefetch (prefetch bit=1 and confirmation bit=0), the used bit from the APQ is examined using select logic 383. If it is set to '1', the confirmation bit of the matching L2 BHT entry is set to '1'. This represents a <BA,TA> pair that would have produced a useful prefetch had an actual prefetch been issued. If the used bit is still '0', no action is required. This represents a L2 BHT entry that still does not produce useful prefetches.

If a matching L2 BHT entry is found and the replaced entry from the APQ represents an actual prefetch request (prefetch bit=1 and confirmation bit=1), the used bit is examined using select logic 382. If it is set to '0', the confirmation bit of the matching L2 BHT entry is set to '0'. Note, this represents a prefetch that was not used. By setting the confirmation bit to '0', this L2 BHT entry will issue a fetch-no-data prefetch the next time it is accessed.

The interactions of the APQ and the cache are now discussed. Requests for instructions are sent from the processor to the cache 101. If the item requested is in the cache (a hit) the datum is returned to the processor. However, if the cache request misses in the cache, the APQ is examined to determine if the line of memory has already been prefetched and can be satisfied from the APQ. If the miss is not in the line prefetch buffers (field 372 of FIG. 132), the line is requested from the memory using path 396.

The APQ controls compare the cache request to the entries saved in the APQ to determine if the request can be satisfied from the APQ. The miss address is sent to the APQ via path 386. The APQ controls compare the address of the miss to the directory addresses (field 374 of FIG. 13) held in the APQ. If there is a match, then the APQ controls determine if the entry was actually prefetched (contained in the line prefetch buffers) or the result of a fetch-no-data request. The confirmation bit and prefetch bit of the matching entry are examined to determine if the line was prefetched. If these values are set to '1', the line of memory is contained in the line prefetch buffers and the miss is satisfied from the APQ via path 384. By finding the miss in the prefetch buffers, the miss is returned to the cache much faster than satisfying the miss from the memory. Additionally, the used bit (field 378 of FIG. 13) is set to '1' and the valid bit (field 379 of FIG. 13) is set to '0' of the matching APQ entry. By setting the valid bit to '0', the matching APQ entry is immediately made available for replacement. This action extends the amount of time that the unused entries in the APQ are made available for use and not subject for replacement. Note, whenever a prefetch is used by the processor there is no need to update the L2 BHT entry that initiated the prefetch.

If the miss address matches the address contained in the directory address field of the APQ and the corresponding confirmation bit is '0' and the prefetch bit is set to '1', the entry represents a fetch-no-data request. The miss is not contained in the line prefetch buffer and the line of memory (miss) must be requested from memory via path 396. However, the used bit of the matching APQ entry is set to '1'. By setting the used bit to '1', the confirmation mechanism can update the corresponding L2 BHT entry that initiated the fetch-no-data request to indicate that an actual prefetch would have been used. The corresponding L2 BHT entry will be updated when this APQ entry is chosen for replacement. Recall, this information is sent to the L2 BHT update logic 381 when a new entry is made and this entry was chosen for replacement.

If the cache miss is not found in the APQ then the miss address is sent to the memory via path 396.

Cache misses are returned from memory via path 398. Compare logic 388 determines if the miss was due to a demand miss or a prefetch miss. If the miss was caused by a prefetch it will bypass the cache and is sent to the APQ where it is saved in a line prefetch buffer. If the miss was caused by a demand fetch it is sent directly to the cache 101.

Described above is a mechanism used to prefetch BHT entries from a large second level branch history table to a small and fast first level branch history table, as well as prefetch lines of memory into the cache. The mechanism is a preferred embodiment but does not indicate that alternative prefetching schemes are less effective. Alternative prefetching schemes are given below.

In an alternate embodiment, the prefetching mechanism can be extended to include multiple levels of branch history information where branch history information is prefetched between adjacent levels of the branch history hierarchy. For example, in a three level BHT, the second level of the BHT can simultaneously be prefetching branch information to the lower level BHT (L1 BHT) while the third level (upper level) of the BHT is prefetching branch information to the second level BHT. An initial prefetch address can be sent to an upper level of the branch history hierarchy whenever there is a branch prediction error detected in a lower level. For example, the L2 BHT is sent an initial prefetch address whenever a branch prediction error occurs in the first level. Similarly, an initial prefetch address can be sent to the L3 BHT whenever a branch prediction error is detected in a lower level of the branch history information, (L1 BHT or L2 BHT). When this occurs, the L3 BHT will begin prefetching branch information from the L3 BHT to the L2 BHT while the L2 BHT will be simultaneously transferring (prefetching) branch information from the L2 BHT to the L1 BHT. Each upper level of the branch history hierarchy (L2 BHT and L3 BHT) will use the initial prefetch address to identify nearest neighbor lines in their level of the branch history hierarchy and transfer the branch information to the lower level.

Similarly, the branch history information can be used to prefetch blocks of memory (cache lines) between levels of memory in a multi-level memory organization. For example, in a three level memory hierarchy (consisting of L1, L2, and L3 caches), the address of a nearest neighbor line is sent to the L2 memory to prefetch a block of memory into the L1 cache. If the block of memory resides in the L3, then a prefetch will be initiated in the L3 cache and a block of memory will be sent from the L3 cache to the L2 cache and L1 cache.

In an alternate embodiment, cache memory can be substituted for the upper levels of the branch history table. For example, consider a processor with an L1, L2, and L3 cache. The L2 cache can hold the information that was saved in the L2 BHT. In this embodiment, the L2 cache holds the branch address, target address, and other branch information of each BHT entry that has aged out of the L1 BHT. Any prefetch action requesting branch information to be sent to the L1 BHT would be sent to the L2 cache. The L2 cache will then be searched (in a similar manner as the L2 BHT) for any branch information contained in a block of memory identified by the initial prefetch address and send that branch information to the L1 BHT. Similarly, the L2 cache will continue to prefetch branch information to the L1 BHT by identifying nearest neighbor lines and send the branch information contained in a nearest neighbor line to the L1 BHT. In this embodiment, special tag addresses would have to be saved in the L2 cache directory to identify that the information saved is the L2 memory is BHT branch information.

In an alternate embodiment, additional prefetch bits can be added to each L2 BHT entry indicating more elaborate prefetching schemes can be attempted. For example, multiple next sequential bits can be added to indicate that the line following the target address and/or the line following the branch address should be prefetched. Obviously, the confirmation mechanism used by the APQ to detect when a prefetch is used/not-used would have to be enhanced. Here the APQ would need used bits for each line prefetched and tag fields to identify the L2 BHT entry that initiated the prefetch.

Other embodiments of the invention will be apparent to those skilled in the art from consideration of the specification and practice of the invention disclosed herein. It is intended that the specification and examples be considered as examples only, with the true scope of the invention being indicated by the claims.

What is claimed is:

1. A method for prefetching instructions, the method comprising:
    prefetching branch history table (BHT) entries from an L2 BHT to an L1 BHT; and
    prefetching cache lines identified by the BHT entries from a L2 cache to a L1 cache, wherein the prefetching of the BHT entries comprises:
        the L2 BHT receiving an initial prefetch address from the L1 BHT; and
        in response to the initial prefetch address,
            identifying a cache line address from the initial prefetch address;
            identifying first L2 BHT entries in the L2 BHT that have branch addresses that match the cache line address;
            transferring the first L2 BHT entries to the L1 BHT;
            identifying nearest cache line addresses from target addresses of the first L2 BHT entries, wherein the nearest cache line addresses are within a predefined linking distance from the initial prefetch address, the linking distance representing the number of links between a nearest cache line address and the initial prefetch address;
            identifying second L2 BHT entries in the L2 BHT that have branch addresses that match the identified nearest cache line addresses; and
            transferring the second L2 BHT entries to the L1 BHT,
        wherein the linking distance is fetched each time the prefetching of the BHT entries is performed and the linking distance is greater than one.

2. The method of claim 1, wherein the nearest cache line addresses include at least one address that is sequential to the cache line address.

3. The method of claim 1, wherein the BHT entries include branch address fields, target address fields, and branch direction information.

4. The method of claim 1, further comprising:
    recursively identifying new cache line addresses from target addresses of previously identified BHT entries until a linking distance of a new cache line address exceeds the predefined linking distance.

5. The method of claim 4 wherein the recursive identification of new cache lines terminates when a new prefetch address is received by the L2 BHT.

6. The method of claim 1, wherein the identifying nearest cache line addresses is performed concurrently with normal branch prediction.

7. The method of claim 1, wherein the BHT entries prefetched from the L2 BHT to the L1 BHT include BHT entries prefetched from higher levels of cache memory to lower levels of cache memory.

8. The method of claim 1, wherein the BHT entries are stored in multi-levels of memory.

9. The method of claim 1, wherein the initial prefetch address includes address information specifying the cache line and branch history information containing a branch address, target address and branch direction information.

10. A method for prefetching branch history information from a higher-level branch history table to a lower-level branch history table for a system including a processor having a multistage execution pipeline, an instruction buffer associated with the pipeline, a memory, and at least two levels of cache associated with the memory, wherein the higher-level branch history table includes branch history information comprising prefetch bits, the method comprising:
    receiving a request at the higher-level branch history table to prefetch branch history information for a cache line address from the lower-level branch history table; and
    in response to the request,
        identifying first branch history information in the higher-level branch history table that have branch addresses that match the cache line address;
        identifying nearest neighbor line addresses from branch addresses of the identified first branch history information that are within a predefined linking distance from the branch addresses; and
        identifying second branch history information in the higher-level branch history table that have branch addresses that match the cache line address;
        prefetching the first and second branch history information from the higher-level branch history table to the lower-level branch history table; and
        prefetching cache lines identified by the identified branch history information from a higher-level cache to a lower-level cache when the prefetch bits of the identified branch history information indicate that a respective cache line has caused a cache miss,
        wherein the steps of prefetching are performed asynchronously, and
        wherein the linking distance is fetched each time the first and second branch history information prefetching is performed and the linking distance is greater than one.

11. The method of claim 10, wherein the nearest neighbor line addresses include line addresses for branches associated with a next sequential block of memory and branches associated with blocks of memory branched to from the cache line address.

12. The method of claim 10, further comprising recursively identifying the second branch history information until a predefined linking distance between the first and second branch history information has been exceeded.

13. The method of claim 12, wherein the recursive identification terminates when a new request is received at the higher-level branch history table to prefetch branch history information for a new cache line address.

14. The method of claim 10, wherein the identifying second branch history information is performed concurrently with normal branch prediction mechanism of the processor.

15. The method of claim 10, further comprising confirming the usefulness of prefetching a block of memory from the higher level memory area to the lower level memory area from information saved in the branch history information.

16. A program storage device readable by a machine, tangibly embodying a program of instructions executable on the machine to perform method steps for prefetching branch history information from a higher-level branch history table to a lower-level branch history table for a system including a processor having a multistage execution pipeline, an instruction buffer associated with the pipeline, a memory, and at least two levels of cache associated with the memory, the method steps comprising:

receiving a request at the higher-level branch history table to prefetch branch history information for a specified block of memory from the lower-level branch history table; and in response to the request;

identifying additional branch history information to prefetch from the branch history information;

prefetching the branch history information for the specified block of memory, and the additional branch history information, from the higher-level branch history table to the lower-level branch history table; and prefetching instructions identified by the branch history information from a higher-level cache to a lower-level cache; and prefetching instructions identified by the additional branch history that are a predefined linking distance away from the branch history information from the higher level cache to the lower-level cache, wherein the steps of prefetching are performed asynchronously and, wherein the linking distance is set so as to prevent the lower-level branch history table from filling up with branch history information.

17. In a data processing system including a main memory subsystem, a hierarchical cache subsystem associated with said main memory subsystem and comprising at least two levels of cache, and a hierarchical branch history table subsystem having at least two levels, a method comprising the steps of:

receiving a prefetch request for a block of instructions stored in a higher-level cache of the main memory subsystem; and in response to the prefetch request, searching a higher-level branch history table of the hierarchical branch history table subsystem for first branch history information that corresponds to the block of instructions;

determining additional blocks of instructions in the higher-level cache from target address of branches in the first branch history information that are within a predefined linking distance from the branches;

searching the higher-level branch history table for second branch history information that corresponds to a part of the additional block of instructions that have recently caused a cache miss; and moving the block of instructions and the part of additional block of instructions from the higher-level cache to a lower-level cache of the main memory subsystem; and moving the first and second branch history information from the higher-level branch history table to a lower-level branch history table of the hierarchical branch history table subsystem, wherein the linking distance is set so as to prevent the lower-level branch history table from filling up with branch history information.

\* \* \* \* \*